(12) United States Patent
Noh et al.

(10) Patent No.: US 10,944,530 B2
(45) Date of Patent: Mar. 9, 2021

(54) METHOD AND APPARATUS FOR TRANSMITTING AND RECEIVING REFERENCE SIGNAL IN WIRELESS COMMUNICATION SYSTEM

(71) Applicant: Samsung Electronics Co., Ltd., Suwon-si (KR)

(72) Inventors: Hoondong Noh, Suwon-si (KR);
Youngwoo Kwak, Suwon-si (KR);
Cheolkyu Shin, Suwon-si (KR);
Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/412,892

(22) Filed: May 15, 2019

(65) Prior Publication Data
US 2019/0356444 A1 Nov. 21, 2019

(30) Foreign Application Priority Data

May 21, 2018 (KR) .................. 10-2018-0057773

(51) Int. Cl.
*H04B 7/06* (2006.01)
*H04L 5/00* (2006.01)
*H04W 72/04* (2009.01)
*H04W 80/02* (2009.01)
*H04L 1/00* (2006.01)

(52) U.S. Cl.
CPC .......... *H04L 5/0051* (2013.01); *H04L 1/0026* (2013.01); *H04L 5/0098* (2013.01); *H04W 72/042* (2013.01); *H04W 72/046* (2013.01); *H04W 80/02* (2013.01)

(58) Field of Classification Search
None
See application file for complete search history.

(56) References Cited

U.S. PATENT DOCUMENTS

2015/0200763 A1* 7/2015 Dai .................. H04L 5/0064
370/329
2015/0341091 A1* 11/2015 Park .................. H04B 7/0617
375/267

(Continued)

FOREIGN PATENT DOCUMENTS

WO 2017/023043 A1 2/2017

OTHER PUBLICATIONS

Qualcomm Incorporated, "Remaining issues on TRS", R1-1804795, 3GPP TSG RAN WG1 Meeting #92bis, Apr. 7, 2018.

(Continued)

*Primary Examiner* — Brandon M Renner
(74) *Attorney, Agent, or Firm* — Jefferson IP Law, LLP

(57) ABSTRACT

A communication method and system for converging a 5th-generation (5G) communication system for supporting higher data rates beyond a 4th-generation (4G) system with a technology for Internet of things (IoT) are provided. The disclosure may be applied to intelligent services based on the 5G communication technology and the IoT-related technology, such as smart home, smart building, smart city, smart car, connected car, health care, digital education, smart retail, security and safety services. Disclosed are a method and an apparatus for configuring, transmitting, and receiving a reference signal in a wireless communication system.

20 Claims, 23 Drawing Sheets

(56) References Cited

U.S. PATENT DOCUMENTS

| | | | |
|---|---|---|---|
| 2018/0205526 A1 | 7/2018 | Kim et al. | |
| 2019/0059054 A1* | 2/2019 | Lee | H04L 5/005 |
| 2019/0116012 A1* | 4/2019 | Nam | H04W 72/046 |
| 2019/0215117 A1* | 7/2019 | Lee | H04L 5/0048 |
| 2019/0260447 A1* | 8/2019 | Nam | H04B 7/0626 |

OTHER PUBLICATIONS

Vivo, "Remaining issues on TRS", R1-1803826, 3GPP TSG RAN WG1 NR #92bis, Apr. 6, 2018.
Huawei et al., "Further discussion on introducing aperiodic TRS", R1-1804443, 3GPP TSG RAN WG1 Meeting #92bis, Apr. 7, 2018.
Nokia et al., "Remaining Details of TRS Design", R1-1805112, 3GPP TSG RAN WG1 Meeting #92bis, Apr. 7, 2018.
International Search Report dated Aug. 27, 2019, issued in International Patent Application No. PCT/KR2019/005827.

* cited by examiner

METHOD AND APPARATUS FOR TRANSMITTING AND RECEIVING REFERENCE SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0057773, filed on May 21, 2018, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for configuring a reference signal to effectively provide services.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data (BD) processing technology through connection with a cloud server, has emerged. As technology elements, such as "sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described BD processing technology may also be considered to be as an example of convergence between the 5G technology and the IoT technology.

In order to transmit and receive a reference signal proposed in the above-mentioned next-generation communication system or 5G communication system, there is growing demand for a method of efficiently transmitting and receiving a reference signal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for configuring a reference signal to effectively providing services in a wireless communication system.

Additional aspects will be set forth in part in the description which follows and, in part, will be apparent from the description, or may be learned by practice of the presented embodiments.

In accordance with an aspect of the disclosure, a method of receiving a reference signal of a terminal is provided. The method includes receiving a first reference signal for time and frequency tracking from a base station, changing a bandwidth or a beam, determining whether a condition of a second reference signal for tracking in a changed bandwidth or changed beam is satisfied and receiving the second reference signal from the base station, in case that the condition of the second reference signal is satisfied.

In accordance with another aspect of the disclosure, a terminal is provided. The terminal includes a transceiver configured to transmit and receive a signal, and a controller configured to receive a first reference signal for time and frequency tracking from a base station, change a bandwidth or a beam, determine whether a condition of a second reference signal for tracking in a changed bandwidth or changed beam is satisfied, and, receive a second reference signal from the base station in case that the condition of the second reference signal is satisfied.

In accordance with another aspect of the disclosure, a method of transmitting a reference signal of a base station is provided. The method includes transmitting a first reference signal for time and frequency tracking to a terminal, changing a bandwidth or a beam with respect to the terminal, determining whether a condition of a second reference signal for tracking in a changed bandwidth or a changed beam is satisfied, and transmitting a second reference signal to the terminal in case that the condition of the second reference signal is satisfied.

In accordance with another aspect of the disclosure, a base station is provided. The base station includes a transceiver configured to transmit and receive a signal, and a controller configured to transmit a first reference signal for time and frequency tracking to a terminal, change a bandwidth or a beam with respect to the terminal, determine whether a condition of a second reference signal for tracking in a changed bandwidth or a changed beam is satisfied, and, transmit a second reference signal to the terminal in case that the condition of the second reference signal is satisfied.

According to the disclosure, it is possible to effectively configure and transmit/receive a reference signal in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from to the following description taken in conjunction with the accompanying drawings, in which.

Throughout the drawings, like reference numerals will be understood to refer to like parts, components, and structures.

DETAILED DESCRIPTION

Figure 1:
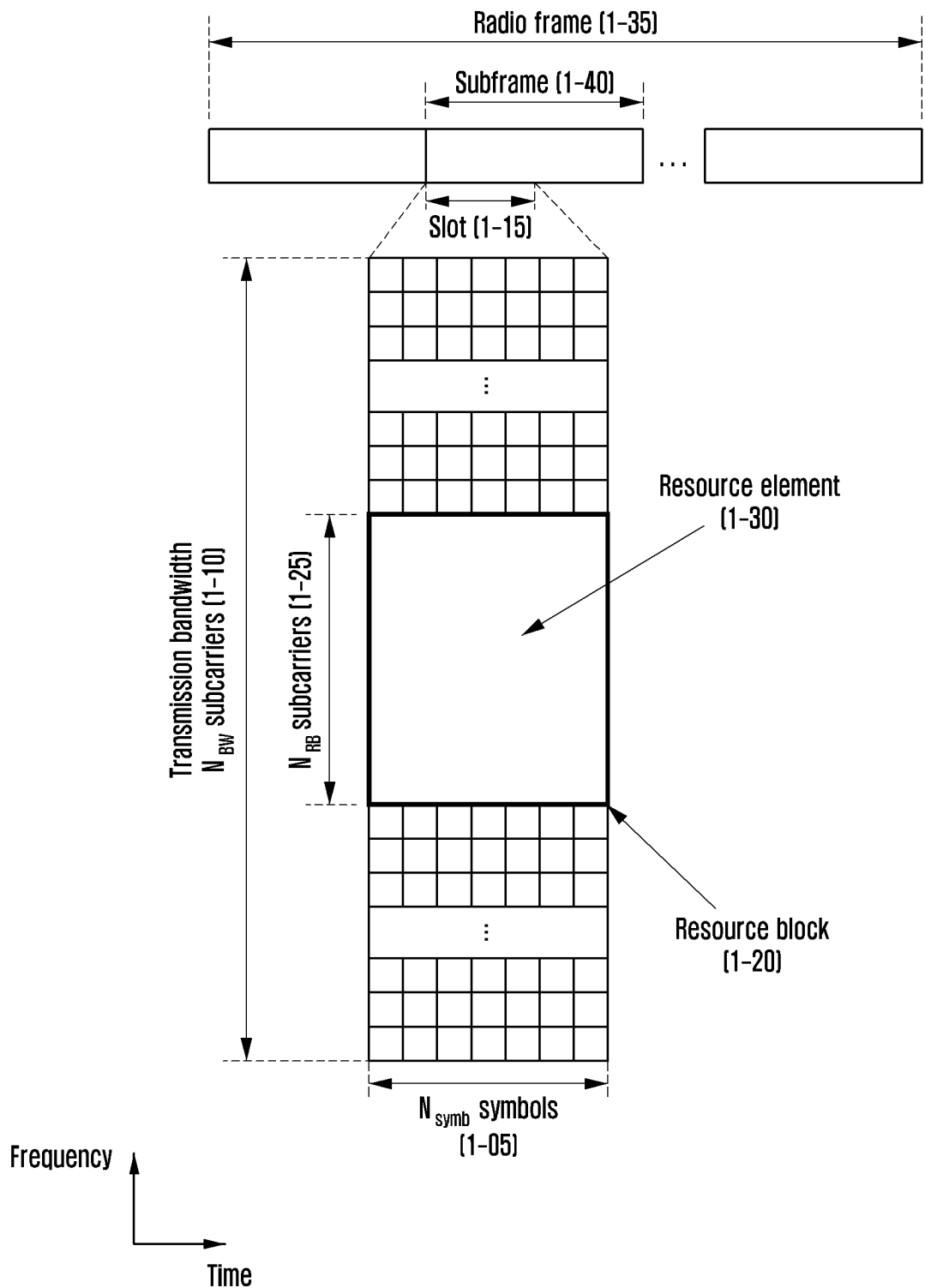
FIG. 1 is a view illustrating a time-frequency domain transmission structure of long-term evolution (LTE), LTE-advanced (LTE-A), new radio (NR), or wireless communication systems similar thereto according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve the same will become apparent by making reference to the embodiments described in detail below in conjunction with the accompanying drawings. It should be understood, however, that the disclosure is not limited to the embodiments set forth herein, but may be embodied in many different forms, and the embodiments of the disclosure are provided in order to make a perfect implementation of the disclosure and in order to fully disclose the scope of the disclosure to those skilled in the art, so that the disclosure shall be defined only by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an Application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more central processing units (CPUs) within a device or a security multimedia card. Also, according to some embodiments, "unit" may include one or more processors.

Hereinafter, the operating principle of the disclosure will be described in detail with reference to the accompanying drawings. In the following description of the disclosure, a detailed description of known configurations or functions incorporated herein will be omitted when it is determined that the detailed description may make the subject matter of the disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Hereinafter, a base station (BS), which is an entity for performing resource allocation to a terminal, may be at least one of gNode B, eNode B, Node B, a wireless access unit, a base station controller, or a node in a network. A terminal may include user equipment (UE), a mobile station (MS), a cellular phone, a smart phone, a computer, or a multimedia system capable of performing communication functions. The disclosure is not limited to the above examples.

Hereinafter, the disclosure will describe a technique in which a terminal receives broadcast information from a base station in a wireless communication system. The disclosure relates to a communication technique in which 5th-generation (5G) communication systems to support higher data rates than 4th-generation (4G) systems and Internet of things (IoT) technology converge, and a system thereof. The disclosure may be applied to intelligent services (e.g., smart home, smart buildings, smart cities, smart or connected cars, health care, digital education, retail, security and safety services, and the like) based on 5G communication technologies and IoT-related technologies.

The terms referring to broadcast information, the terms referring to control information, the terms related to communication coverage, the terms referring to a state change (e.g., an event), the terms referring to network entities, the terms referring to messages, the terms referring to components of the apparatus, and the like, which are used herein, are only examples provided for the convenience of explanation. Accordingly, the disclosure is not limited to the terms described below, and other terms having equivalent technical meanings may be used.

Hereinafter, for the convenience of explanation, some of the terms and names defined in the $3^{rd}$-generation partnership project (3GPP) long-term evolution (LTE) standard may be used. However, the disclosure is not limited to the above terms and names, and may be equally applied to systems conforming to other standards.

The wireless communication system is advancing to a broadband wireless communication system for providing high-speed and high-quality packet data services using communication standards, such as high-speed packet access (HSPA) of 3GPP, LTE or evolved universal terrestrial radio access (E-UTRA), LTE-advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link through which the terminal (i.e., UE or MS) transmits data or control signals to the BS (e.g., eNode B), and downlink refers to a radio link through which the base station transmits data or control signals to the terminal. The above multiple access scheme separates data or control information of the respective users by allocating and operating time-frequency resources to transmit the data or control information for each user so as to avoid overlapping each other (that is, so as to establish orthogonality).

Since a 5G communication system, which is a communication system subsequent to LTE, must freely reflect various requirements of users, service providers, and the like, services satisfying various requirements must be supported. The services considered for the 5G communication system include enhanced mobile broadband (eMBB) communication, massive machine type communication (mMTC), ultra-reliability low-latency communication (URLLC), and the like.

According to some embodiments, the eMBB aims at providing a data rate higher than that supported by existing LTE, LTE-A, or LTE-Pro. For example, in the 5G communication system, the eMBB provides a peak data rate of 20 Gbps in the downlink and a peak data rate of 10 Gbps in the uplink for a single base station. Furthermore, the eMBB provides an increased user perceived data rate to the terminal. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of the band of 2 GHz used by the current LTE.

In addition, mMTC is being considered to support application services, such as the IoT, in the 5G system. The mMTC has requirements, such as support of connection of large numbers of terminals in the cell, enhancement of the terminal coverage, improved battery time, and a reduction in the cost of a terminal, to effectively provide the IoT. Since the IoT functions are provided to various sensors and various devices to thus provide a communication function, it supports a large number of terminals (e.g., 1,000,000 terminals/km$^2$) in the cell. In addition, the terminals supporting the mMTC may require wider coverage than those of other services provided by the 5G communication system because the terminals are likely to be located in a shadow area, such as a basement of a building, which may not be covered by a cell due to the nature of the service. Terminals supporting the mMTC may require a very long battery life time because the terminals should be configured to be inexpensive and because it is difficult to frequently replace the battery of the terminal.

Finally, the URLLC, which is a cellular-based mission-critical wireless communication service, is used for remote control for robots or machines, industrial automation, unmanned aerial vehicles, remote health control, emergency alert, or the like, and should provide communication with ultra-low latency and ultra-reliability. For example, a service supporting the URLLC should satisfy an air interface latency of less than 0.5 ms, and also requires a packet error rate of 10$^{-5}$ or less. Therefore, for services supporting the URLLC, the 5G system should provide a transmit time interval (TTI) shorter than those of other services, and also requires a design for allocating large amount of resources in the frequency band. However, the above-mentioned mMTC, URLLC, and eMBB are only examples of different types of services, and the disclosure is not limited to the types of services described above.

The above-mentioned services considered in the 5G communication system should converge into a single framework. That is, the respective services are preferably integrated into a single system to then be controlled and transmitted, instead of operating the services independently, for efficient resource management and control.

In addition, although the embodiments of the disclosure will be described below by way of example as LTE, LTE-A, LTE-Pro, or new radio (NR) systems, the embodiments of the disclosure may be applied to other communication systems having similar technical backgrounds or channel forms. Further, the embodiments of the disclosure may be applied to other communication systems through some modifications thereof without departing from the scope of the disclosure according to judgment by those skilled in the art. Hereinafter, the frame structure of the LTE, LTE-A, and 5G system will be described with reference to the drawings, and the design direction of the 5G system will be described.

FIG. 1 is a view illustrating a time-frequency domain transmission structure of LTE, LTE-A, NR, or wireless communication systems similar thereto according to an embodiment of the disclosure.

Referring to FIG. 1, a basic structure of a time-frequency resource area that is a wireless resource area for transmitting data or control channels of an LTE, LTE-A, and NR systems based on a cyclic prefix (CP)-orthogonal frequency division multiplexing (OFDM) (CP-OFDM) or a single carrier-frequency division multiple access (SC-FDMA) waveform is shown.

In FIG. 1, the horizontal axis represents a time domain, and the vertical axis represents a frequency domain. An uplink (UL) may be a radio link through which the terminal transmits data or control signals to the base station, and a downlink (DL) may be a radio link through which the base station transmits data or control signals to the terminal.

The minimum transmission unit in the time domain of the LTE, LTE-A, and 5G systems is an OFDM symbol or an SC-FDMA symbol, and $N_{symb}$ symbols 1-05 may constitute one slot 1-15. In case of the LTE and LTE-A systems, two slots including $N_{symb}=7$ symbols may constitute one subframe 1-40. In addition, according to some embodiments, the 5G system may support two types of slot structures, such as slots and mini-slots (or non-slots). The number of symbols ($N_{symb}$) of a 5G slot may be 7 or 14, and $N_{symb}$ of a 5G mini-slot may have one of 1, 2, 3, 4, 5, 6, or 7. In the LTE and LTE-A systems, the length of the slot is 0.5 ms, and the length of the subframe is fixed to 1.0 ms. However, in the 5G system, the length of the slot or mini-slot varies depending on the subcarrier spacing (SCS). In the LTE and LTE-A systems, a radio frame 1-35 is a time-domain unit including 10 subframes. In the LTE and LTE-A systems, the minimum transmission unit in the frequency domain is a subcarrier of 15 kHz (subcarrier spacing=15 kHz), and the bandwidth of the total system transmission band includes a total of number ($N_{BW}$) of subcarriers 1-10. The flexible scalable frame structure of the 5G system will be described later.

The basic resource unit in the time-frequency domain is a resource element (RE) 1-30, which may be indicated by an OFDM symbol index or an SC-FDMA symbol index and a subcarrier index. A resource block (RB) {or physical resource block (PRB)} 1-20 may be defined by consecutive $N_{symb}$ OFDM symbols 1-05 or SC-FDMA symbols in the time domain and consecutive $N_{RB}$ subcarriers 1-25 in the frequency domain. Thus, one RB 1-20 includes $N_{symb} \times N_{RB}$ REs 1-30. In the LTE and LTE-A systems, data mapping is performed in the unit of an RB, and the base station performs scheduling for a predetermined terminal by a pair of RBs constituting one subframe. The number of SC-FDMA symbols or the number of OFDM symbols ($N_{symb}$) is determined by the length of a cyclic prefix (CP) that is added to each symbol to prevent interference between symbols. For example, if a normal CP is applied, $N_{symb}=7$, and if a scalable CP is applied, $N_{symb}=6$. The scalable CP may be applied to a system in which the propagation distance is relatively greater than that of the normal CP, thereby maintaining orthogonality between the symbols.

According to some embodiments, the subcarrier spacing, the length of the CP, and the like are information important for OFDM transmission and reception, and the base station and the terminal need to recognize the values thereof in common for effective transmission and reception.

The frame structure of the LTE and LTE-A systems is designed in consideration of general voice/data communication, so that it is limited in scalability to satisfy various services and requirements of the 5G system. Therefore, in the 5G system, it is preferable to flexibly define and operate the frame structure in consideration of various services and requirements.

Figure 2:
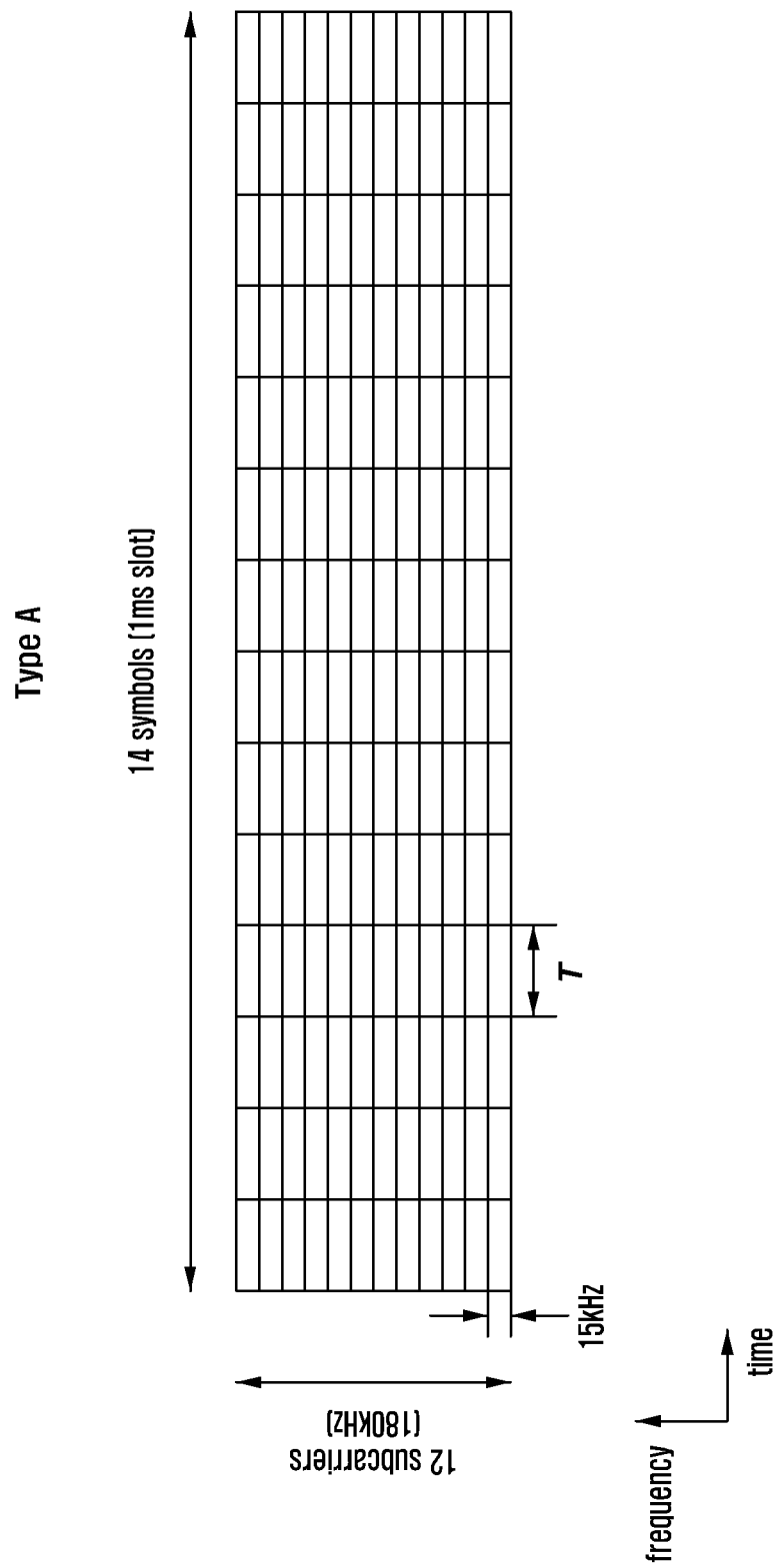
FIGS. 2, 3, and 4 illustrate a scalable frame structure according to various embodiments of the disclosure.
Figure 3:
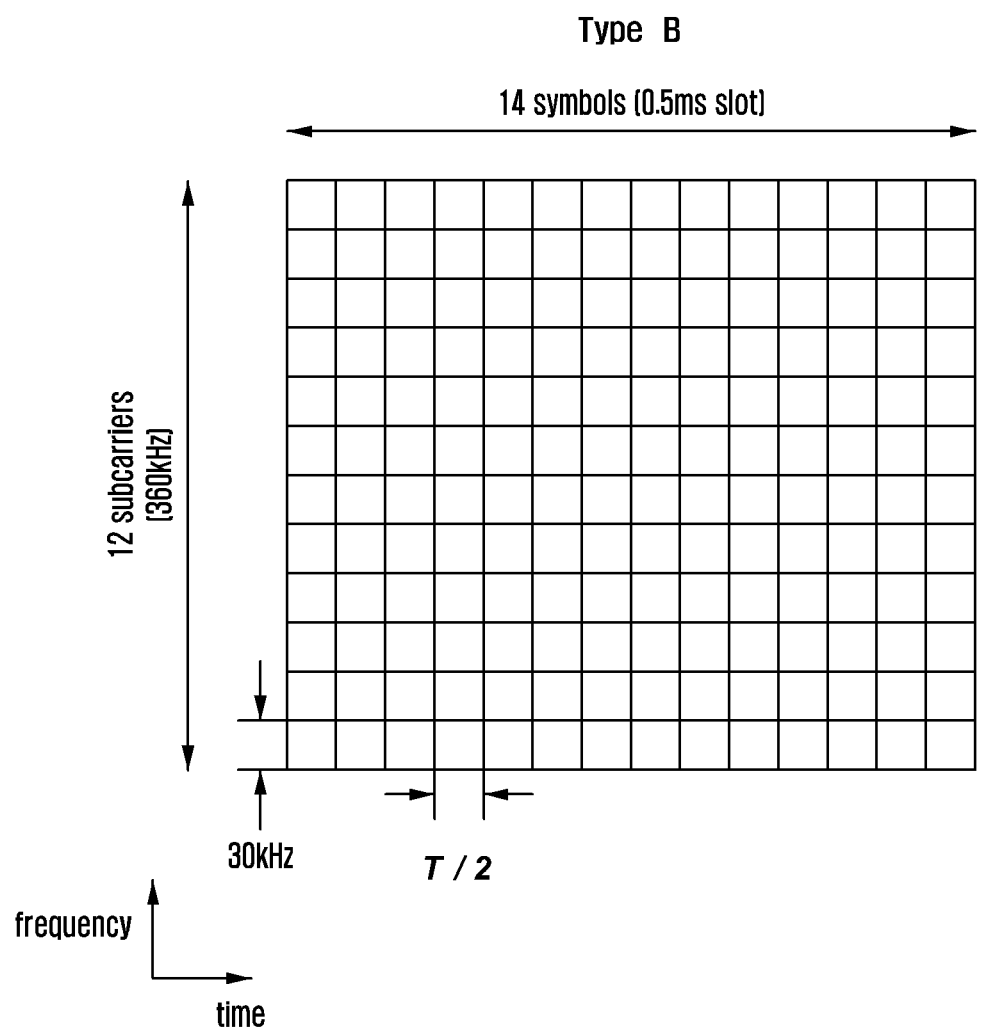
Figure 4:
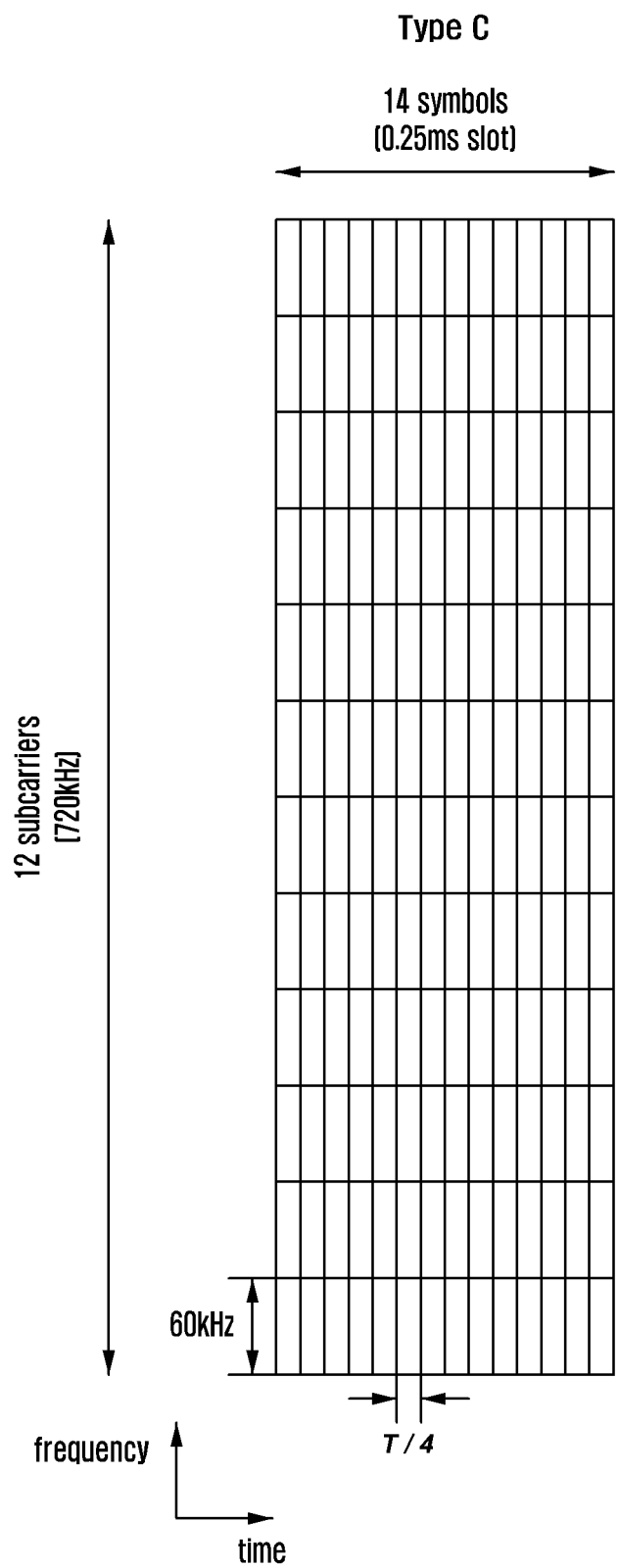

FIGS. 2, 3 and 4 illustrate scalable frame structures according to various embodiments of the disclosure.

Referring to FIGS. 2, 3, and 4, a set of parameters is illustrated that define a scalable frame structure, which include subcarrier spacing, the length of a CP, the length of a slot, and the like. The basic time unit for performing the scheduling may be a slot in the 5G system.

It is expected that the 5G system will coexist with the existing LTE/LTE-A system or will be operated in a dual mode therewith at least in the early days of the introduction of the 5G system in the future. This may allow the existing LTE/LTE-A system to provide stable system operation, and may allow the 5G systems to provide enhanced services. Therefore, the scalable frame structure of the 5G system needs to include at least a frame structure or a set of parameters of the LTE/LTE-A system. Referring to FIG. 2, a 5G frame structure, which is the same as the frame structure of the LTE/LTE-A system, or a set of parameters is shown. FIG. 2 shows the frame structure type A in which the subcarrier spacing is 15 kHz, 14 symbols constitute a slot of 1 ms, and 12 subcarriers (=180 kHz=12*15 kHz) constitute a PRB.

FIG. 3 illustrates the frame structure type B in which the subcarrier spacing is 30 kHz, 14 symbols constitute a slot of 0.5 ms, and 12 subcarriers (=360 kHz=12*30 kHz) constitute a PRB. That is, the subcarrier spacing and the size of the PRB in the frame structure type B are double the subcarrier spacing and the size of the PRB in the frame structure type A, respectively, and the slot length and the symbol length in the frame structure type B are half the slot length and the symbol length in the frame structure type B, respectively.

FIG. 4 illustrates the frame structure type C in which the subcarrier spacing is 60 kHz, 14 symbols constitute a subframe of 0.25 ms, and 12 subcarriers (=720 kHz=12*60 kHz) constitute a PRB. That is, the subcarrier spacing and the size of the PRB in the frame structure type C are four times greater than those in the frame structure type A, and the slot length and the symbol length in the frame structure type C are four times smaller than those in the frame structure type A.

That is, generalizing the frame structure type, the parameter sets, such subcarrier spacing, the CP length, the slot length, and the like, have integer multiples between the types of frame structures, thereby providing high scalability. In addition, a subframe having a fixed length of 1 ms may be defined to indicate a reference time unit irrelevant to the frame structure type. Accordingly, one subframe includes one slot in the frame structure type A, one subframe includes two slots in the frame structure type B, and one subframe includes four slots in the frame structure type C. The scalable frame structure is not limited to the above-described frame structure type A, B, or C, and it is obvious that the scalable frame structure may be applied to other subcarrier spacing, such as 120 kHz and 240 kHz, and may have different structures.

According to some embodiments, the frame structure types described above may be applied to various scenarios. In terms of the cell size, as the CP length increases, a large cell may be supported. Thus, the frame structure type A may support a relatively large cell, compared to the frame structure type B or C. In terms of the operating frequency band, since a large subcarrier spacing is advantageous for the phase noise recovery in the high-frequency band, the frame structure type C may support a relatively high operating frequency, compared to the frame structure type A or B. In terms of services, since a short subframe length is advantageous for supporting ultra-low latency services, such as URLLC, the frame structure type C is relatively suitable for a URLLC service, compared to the frame structure type A or B.

In addition, a plurality of frame structure types may be multiplexed into a single system for integrated operation.

Figure 5:
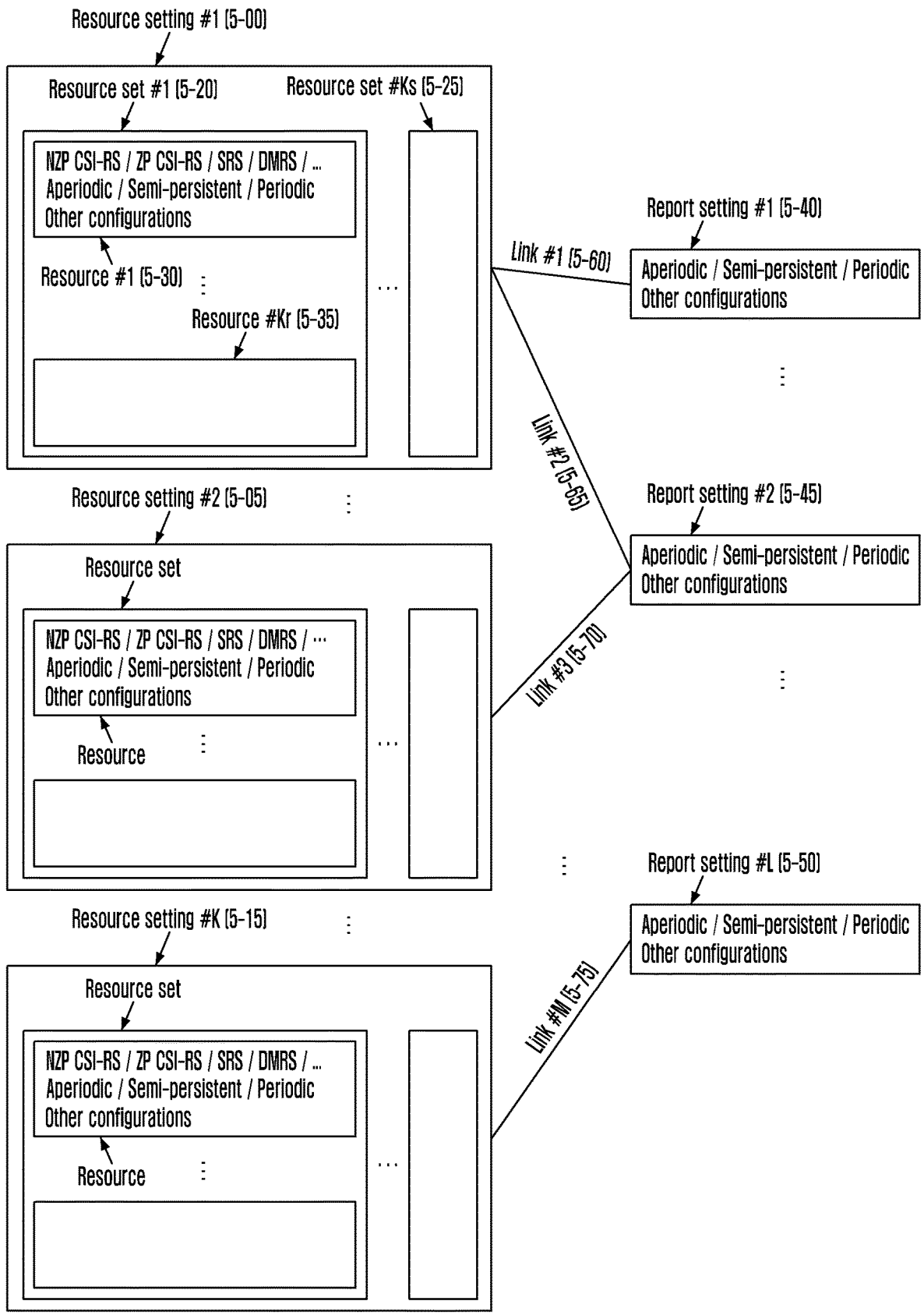
FIG. 5 is a view illustrating a framework of channel state information (CSI) according to an embodiment of the disclosure.

FIG. 5 is a view illustrating a framework of channel state information (CSI) according to an embodiment of the disclosure.

Referring to FIG. 5, FIG. 5 illustrates a CSI framework of the NR system. The CSI framework of the NR system in FIG. 5 includes two elements, such resource settings and report settings, and the report settings are capable of establishing at least one link between the report settings and the resource settings with reference to identifiers (IDs) of the resource settings.

According to some embodiments, the resource settings are elements including information related to a reference signal (RS), and the base station may configure one or more resource settings 5-00, 5-05, and 5-15 to the terminal. In this case, each of the resource settings may include one or more resource sets 5-20 and 5-25, and each resource set may include one or more resources 5-30 and 5-35. Each of the resources 5-30 and 5-35 may include detailed information on the RS, which includes information on the type of RS, such as a non-zero power (NZP) CSI-RS, a zero power (ZP) CSI-RS, a sounding RS (SRS), a demodulation RS (DMRS), and the like, RS transmission characteristic information, such as aperiodic, semi-persistent, periodic, and the like, RE location information through which the RS is transmitted, and the like.

According to some embodiments, the report settings are elements including information related to a CSI reporting method, and the base station may configure one or more report settings 5-40, 5-45, and 5-50 to the terminal. In this case, each of the report settings may include report transmission characteristic information, such as aperiodic, semi-persistent, periodic, and the like, information on the channel through which a report is transmitted {whether it is a physical uplink shared channel (PUSCH) or a physical uplink control channel (PUCCH)}, frequency/time location information of the resource, and the like. In this case, the report settings has at least one channel to which the terminal refers when reporting corresponding CSI or at least one ID for referring to reference signal (or RE location) information for interference measurement, which is illustrated as links 5-60, 5-65, 5-70, and 5-75.

According to some embodiments, if a link 5-60 connects one report setting 5-40 with one resource setting 5-00, the resource setting 5-00 may be used for channel measurement. If links 5-65 and 5-70 connect one report setting 5-45 with two resource settings 5-00 and 5-05, one of the two resource settings may be used for channel measurement, and the other thereof may be used for interference measurement.

The NZP CSI-RS may be the most representative reference signal configured in the resource settings, and each CSI-RS resource configuration set by a higher layer may include at least the following detailed configuration information, but it is not limited to the following examples.

NZP-CSI-RS-Resource ConfigID: IDs of corresponding CSI-RS resource configurations NrofPorts: Number of CSI-RS ports included in corresponding CSI-RS resource CSI-RS-timeConfig: Transmission period and slot offset of corresponding CSI-RS resource CSI-RS-ResourceMapping: Location of OFDM symbol in slot of corresponding CSI-RS resource and location of subcarrier in PRB CSI-RS-Density: Frequency density of corresponding CSI-RS CDMType: code division multiplexing (CDM) length and CDM RE pattern of corresponding CSI-RS CSI-RS-FreqBand: Transmission bandwidth and start location of corresponding CSI-RS Pc: Ratio between physical downlink shared channel (PDSCH) energy per RE (EPRE) and NZP CSI-RS EPRE Pc-SS: Ratio between synchronization signal (SS)/physical broadcast channel (PBCH) block EPRE and NZP CSI-RS EPRE CSI-RS-ResourceRep: NZP CSI-RS resources belonging to one resource set interwork with each other. If the CSI-RS-ResourceRep is in the ON state, the terminal may recognize that the same spatial domain transmission filter is applied to all NZP CSI-RS resources belonging to the resource set (i.e., the terminal may assume that the base station has used the same transmission beam) and that the respective NZP CSI-RS resources have the same number of CSI-RS ports and the same periodicity. If the CSI-RS-ResourceRep is in the OFF state, the terminal cannot assume that the same spatial domain transmission filter is applied to all NZP CSI-RS resources belonging to the resource set (i.e., the terminal cannot assume that the base station has used the same transmission beam), and cannot recognize that the respective NZP CSI-RS resources have the same number of CSI-RS ports and the same periodicity.

According to some embodiments, in the NR system, one CSI-RS resource may be configured with one of {1, 2, 4, 8, 12, 16, 24, and 32} as the number of CSI-RS ports, and different degrees of configuration freedom may be supported according to the number of CSI-RS ports configured to the CSI-RS resource. Table 1 shows the configurable density of the CSI-RS, the length and type of the CDM, the start location of the CSI-RS component RE pattern on the frequency axis and the time axis ($\bar{k}$, $\bar{l}$), and the number of frequency axis REs (k') and the number of time axis REs (l') of the CSI-RS component RE pattern according to the number of NR CSI-RS ports (X).

According to some embodiments, the CSI-RS component RE pattern, which is a basic unit of a CSI-RS resource, may include a total of YZ REs including (Y=1+max(k'))REs adjacent to each other on the frequency axis and (Z=1+max(l'))REs adjacent to each other on the time axis. Referring to Table 1, the NR system supports different degrees of configuration freedom of the frequency axis according to the number of CSI-RS ports configured in the CSI-RS resource. In case of 1 port, the CSI-RS may be configured in the PRB regardless of the subcarrier, and the terminal may be assigned with the locations of the CSI-RS REs using a bitmap 6-00 of 12 bits. When {2, 4, 8, 12, 16, 24, and 32} ports and Y=2, the CSI-RS may be configured in every two subcarriers in the PRB, and the terminal may be assigned with the locations of the CSI-RS REs using a bitmap 6-05 of 6 bits. When there are 4 ports and Y=4, the CSI-RS may be configured in every four subcarriers in the PRB, and the terminal may be assigned with the locations of the CSI-RS REs using a bitmap 6-10 of 3 bits. Similarly, the terminal may be assigned with the locations of the CSI-RS REs on the time axis using a bitmap of 14 bits in total. In this case, the length of the bitmap may vary depending on the value Z associated with Table 1 (CSI-RS locations within a slot) as the frequency location assignment, but the principle is similar to the above description, and thus a detailed description thereof will be omitted.

TABLE 1

| Row | Ports X | Density ρ | Ccdm-Type | ($\bar{k}$, $\bar{l}$) | CDM group index j | k' | l' |
|---|---|---|---|---|---|---|---|
| 1 | 1 | 3 | No CDM | ($k_0$, $l_0$), ($k_0$ + 4, $l_0$), ($k_0$ + 8, $l_0$) | 0, 0, 0 | 0 | 0 |
| 2 | 1 | 1, 0.5 | No CDM | ($k_0$, $l_0$) | 0 | 0 | 0 |
| 3 | 2 | 1, 0.5 | FD-CDM2 | ($k_0$, $l_0$) | 0 | 0, 1 | 0 |
| 4 | 4 | 1 | FD-CDM2 | ($k_0$, $l_0$), ($k_0$ + 2, $l_0$) | 0, 1 | 0, 1 | 0 |
| 5 | 4 | 1 | FD-CDM2 | ($k_0$, $l_0$), ($k_0$, $l_0$ + 1) | 0, 1 | 0, 1 | 0 |
| 6 | 8 | 1 | FD-CDM2 | ($k_0$, $l_0$), ($k_1$, $l_0$), ($k_2$, $l_0$), ($k_3$, $l_0$) | 0, 1, 2, 3 | 0, 1 | 0 |
| 7 | 8 | 1 | FD-CDM2 | ($k_0$, $l_0$), ($k_1$, $l_0$), ($k_0$, $l_0$ + 1), ($k_1$, $l_0$ + 1) | 0, 1, 2, 3 | 0, 1 | 0 |
| 8 | 8 | 1 | COM4 (FD2, TD2) | ($k_0$, $l_0$), ($k_1$, $l_0$) | 0, 1 | 0, 1 | 0, 1 |
| 9 | 12 | 1 | FD-CDM2 | ($k_0$, $l_0$), ($k_1$, $l_0$), ($k_2$, $l_0$), ($k_3$, $l_0$), ($k_4$, $l_0$), ($k_5$, $l_0$) | 0, 1, 2, 3, 4, 5 | 0, 1 | 0 |
| 10 | 12 | 1 | CDM4 (FD2, TD2) | ($k_0$, $l_0$), ($k_1$, $l_0$), ($k_2$, $l_0$) | 0, 1, 2 | 0, 1 | 0, 1 |
| 11 | 16 | 1, 0.5 | FD-CDM2 | ($k_0$, $l_0$), ($k_1$, $l_0$), ($k_2$, $l_0$), ($k_3$, $l_0$), ($k_0$, $l_0$ + 1), ($k_1$, $l_0$ + 1), ($k_2$, $l_0$ + 1), ($k_3$, $l_0$ + 1) | 0, 1, 2, 3, 4, 5, 6, 7 | 0, 1 | 0 |
| 12 | 16 | 1, 0.5 | CDM4 (FD2, TD2) | ($k_0$, $l_0$), ($k_1$, $l_0$), ($k_2$, $l_0$), ($k_3$, $l_0$) | 0, 1, 2, 3 | 0, 1 | 0, 1 |
| 13 | 24 | 1, 0.5 | FD-CDM2 | ($k_0$, $l_0$), ($k_1$, $l_0$), ($k_2$, $l_0$), ($k_0$, $l_0$ + 1), ($k_1$, $l_0$ + 1), ($k_2$, $l_0$ + 1), ($k_0$, $l_1$), ($k_1$, $l_1$), ($k_2$, $l_1$), ($k_0$, $l_1$ + 1), ($k_1$, $l_1$ + 1) ($k_2$, $l_1$ + 1) | 0, 1, 2, 3, 4, 5, 6, 7, 8, 9, 10, 11 | 0, 1 | 0 |
| 14 | 24 | 1, 0.5 | CDM4 (FD2, TD2) | ($k_0$, $l_0$), ($k_1$, $l_0$), ($k_2$, $l_0$), ($k_0$, $l_1$), ($k_1$, $l_1$), ($k_2$, $l_1$) | 0, 1, 2, 3, 4, 5 | 0, 1 | 0, 1 |
| 15 | 24 | 1, 0.5 | CDM8 (FD2, TD4) | ($k_0$, $l_0$), ($k_1$, $l_0$), ($k_2$, $l_0$) | 0, 1, 2 | 0, 1 | 0, 1, 2, 3 |

TABLE 1-continued

| Row | Ports X | Density ρ | Ccdm-Type | $(\bar{k}, \bar{l})$ | CDM group index j | k' | l' |
|---|---|---|---|---|---|---|---|
| 16 | 32 | 1, 0.5 | FD-CDM2 | $(k_0, l_0), (k_1, l_0), (k_2, l_0), (k_3, l_0),$<br>$(k_0, l_0 + 1), (k_1, l_0 + 1), (k_2, l_0 + 1), (k_3, l_0 + 1),$<br>$(k_0, l_1), (k_1, l_1), (k_2, l_1), (k_3, l_1),$<br>$(k_0, l_1 + 1), (k_1, l_1 + 1), (k_2, l_1 + 1), (k_3, l_1 + 1)$ | 0, 1, 2, 3,<br>4, 5, 6, 7,<br>8, 9, 10, 11,<br>12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Figure 6:
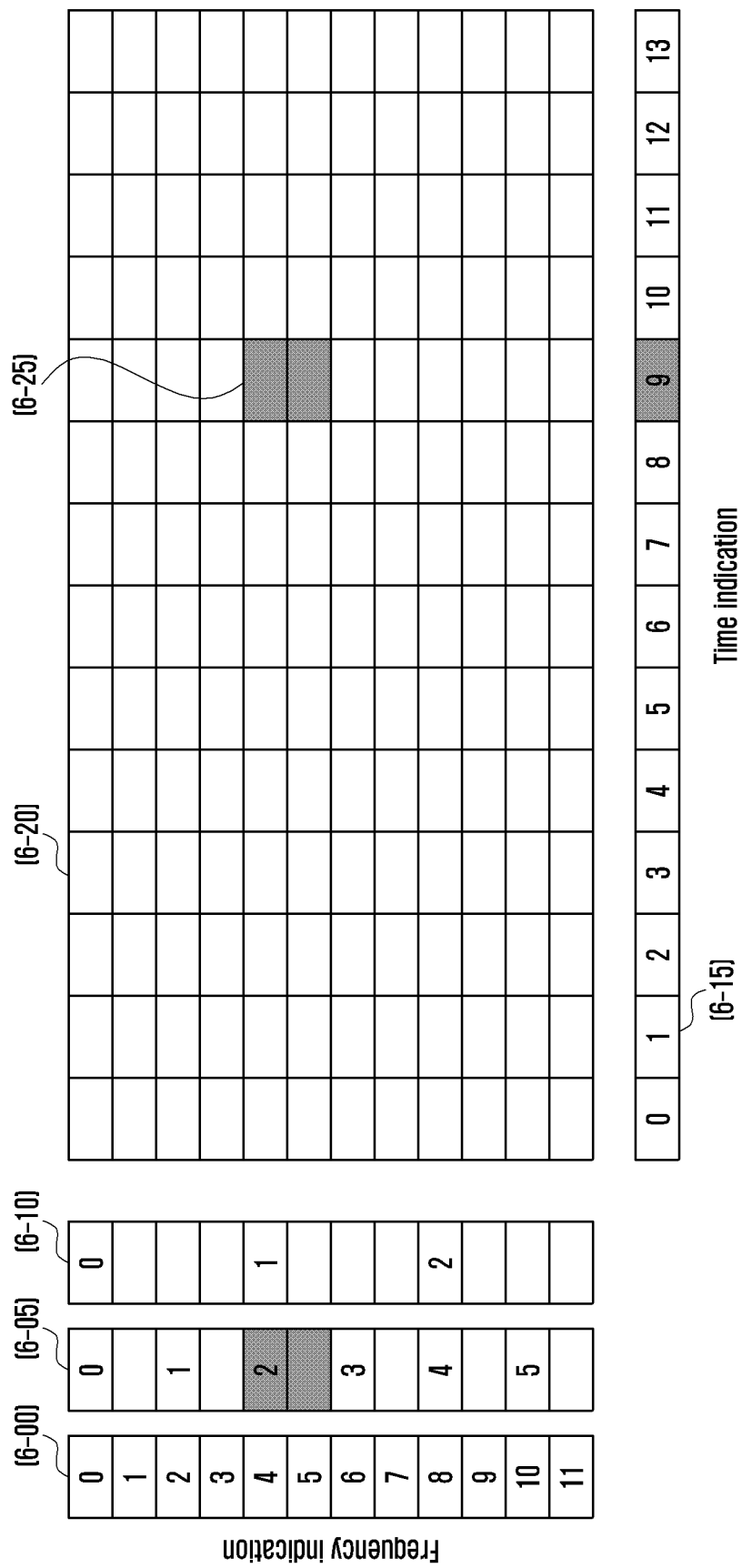
FIG. 6 illustrates the assignment of CSI-reference signal (RS) resource elements by CSI-RS resource mapping according to an embodiment of the disclosure.

FIG. 6 illustrates the assignment of CSI-RS resource elements by CSI-RS resource mapping according to an embodiment of the disclosure.

Referring to FIG. 6, FIG. 6 is a diagram illustrating an example of assignment of CSI-RS REs using CSI-RS-ResourceMapping configured by a higher layer. When X=2 ports, the base station may assign the RE locations of the frequency axis using bitmap 6-05. If the base station assigns the location of a subcarrier on the frequency axis by 2 of bitmap 6-05 and assigns the location of an OFDM symbol 6-15 on the time axis by, the terminal may recognize that the CSI-RS is transmitted in the RE location 6-25 in the corresponding PRB 6-20 on the basis of the same.

As described above, the base station may configure the CSI-RS to the terminal in order to provide other functions, such as rate matching, time/frequency tracking, and the like, as well as the CSI measurement, in the NR system. When configuring the report settings to the CSI-RSs configured for the functions other than the CSI-RS measurement, there may be side effects of consuming the terminal power for generating unnecessary CSI or wasting uplink resources for unnecessary CSI reports.

Figure 7:
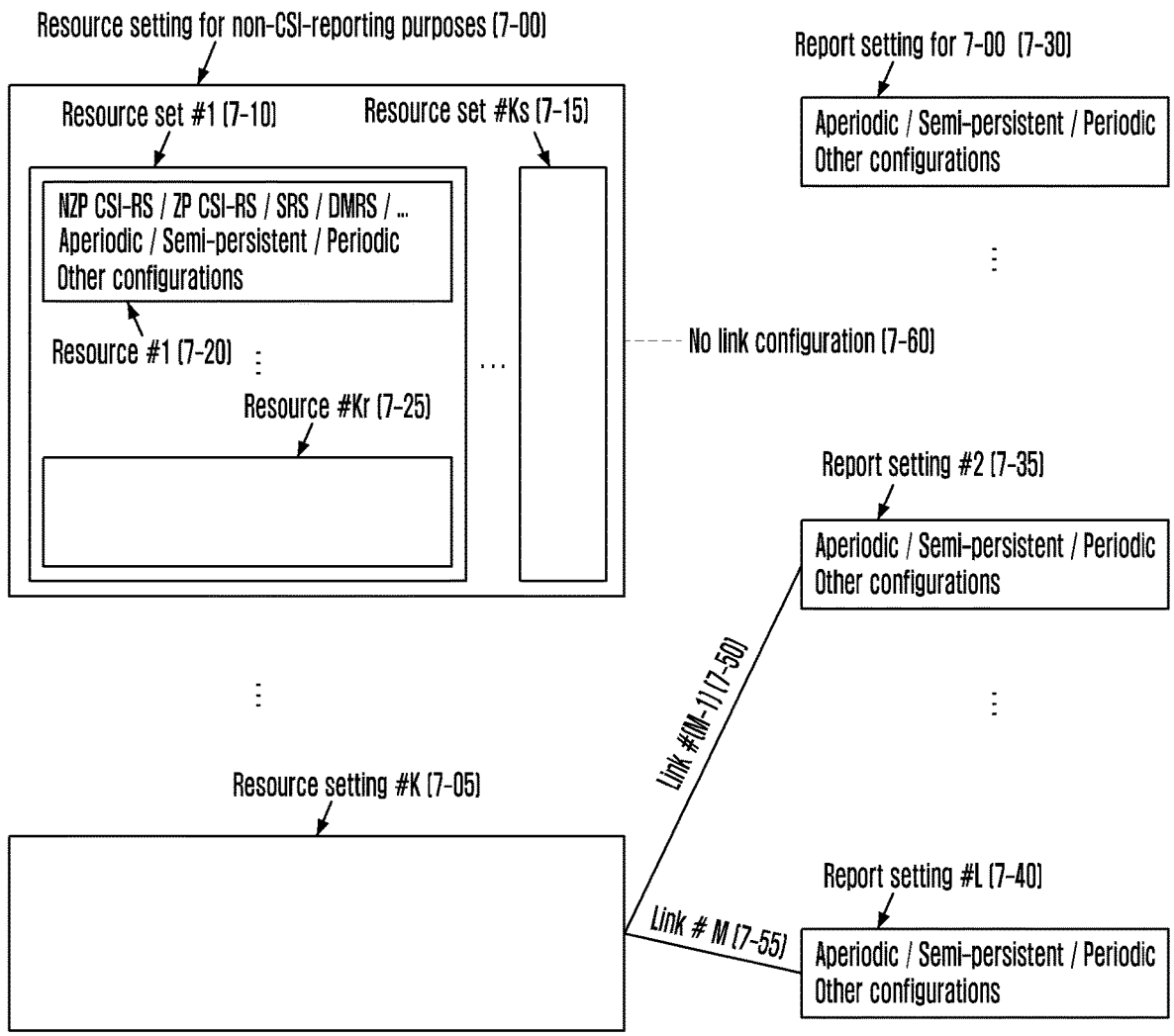
FIG. 7 illustrates configuration of resource settings and report settings for CSI-RS configuration according to an embodiment of the disclosure.

FIG. 7 illustrates configuration of resource settings, report settings, and measurement settings for CSI-RS configuration according to an embodiment of the disclosure.

Referring to FIG. 7, FIG. 7 shows an example of configuration of resource settings, report settings, and measurement settings in order to efficiently configure the CSI-RS dedicated for rate matching or time/frequency tracking.

According to some embodiments, it is possible to configure the CSI-RS for providing functions other than CSI reporting through a resource setting 7-00 including one or more resource sets 7-10 and 7-15 including one or more resources 7-20 and 7-25. In this case, the base station may not include the link corresponding to the resource setting 7-00 in the report setting 7-60, or may not configure the report setting 7-30 corresponding to the resource setting 7-00. The terminal may recognize the difference between the resource setting 7-05 having the corresponding links 7-50 and 7-55 and report settings 7-35 and 7-40 and the resource setting 7-00, and may perform only rate matching, instead of channel estimation for CSI generation, or may perform only time/frequency tracking as necessary, thereby reducing power consumption. In addition, the base station may save uplink resources necessary for 7-30.

In the NR system, a tracking RS (TRS) may be configured for fine time/frequency tracking of the base station. The TRS may be referred to as another term, such as a CSI-RS for tracking, in the standard, but TRS will be used in the disclosure for the convenience of explanation. The TRS may be transmitted in one (X=1) slot or two (X=2) consecutive slots in a specific period, such as 10 ms or 20 ms, which will be referred to as a TRS burst.

Figure 8:
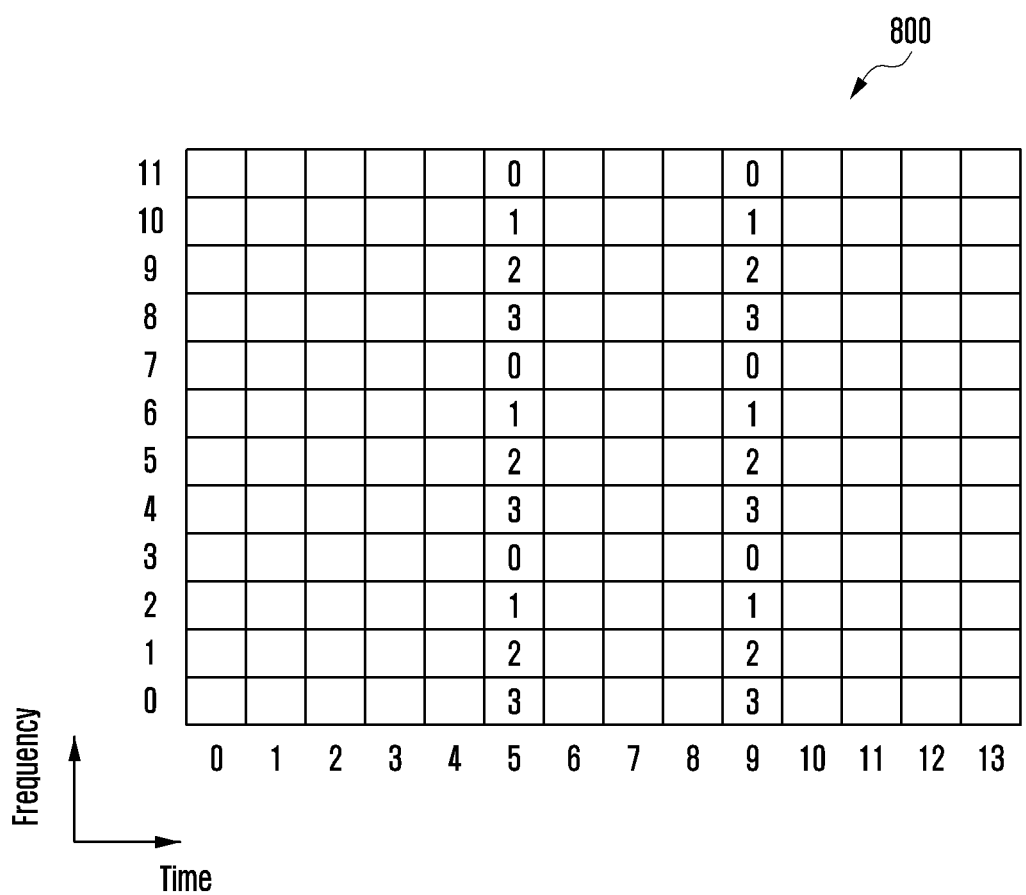
FIGS. 8 and 9 illustrate resource element (RE) patterns of a tracking reference signal (TRS) according to various embodiment of the disclosure.
Figure 9:
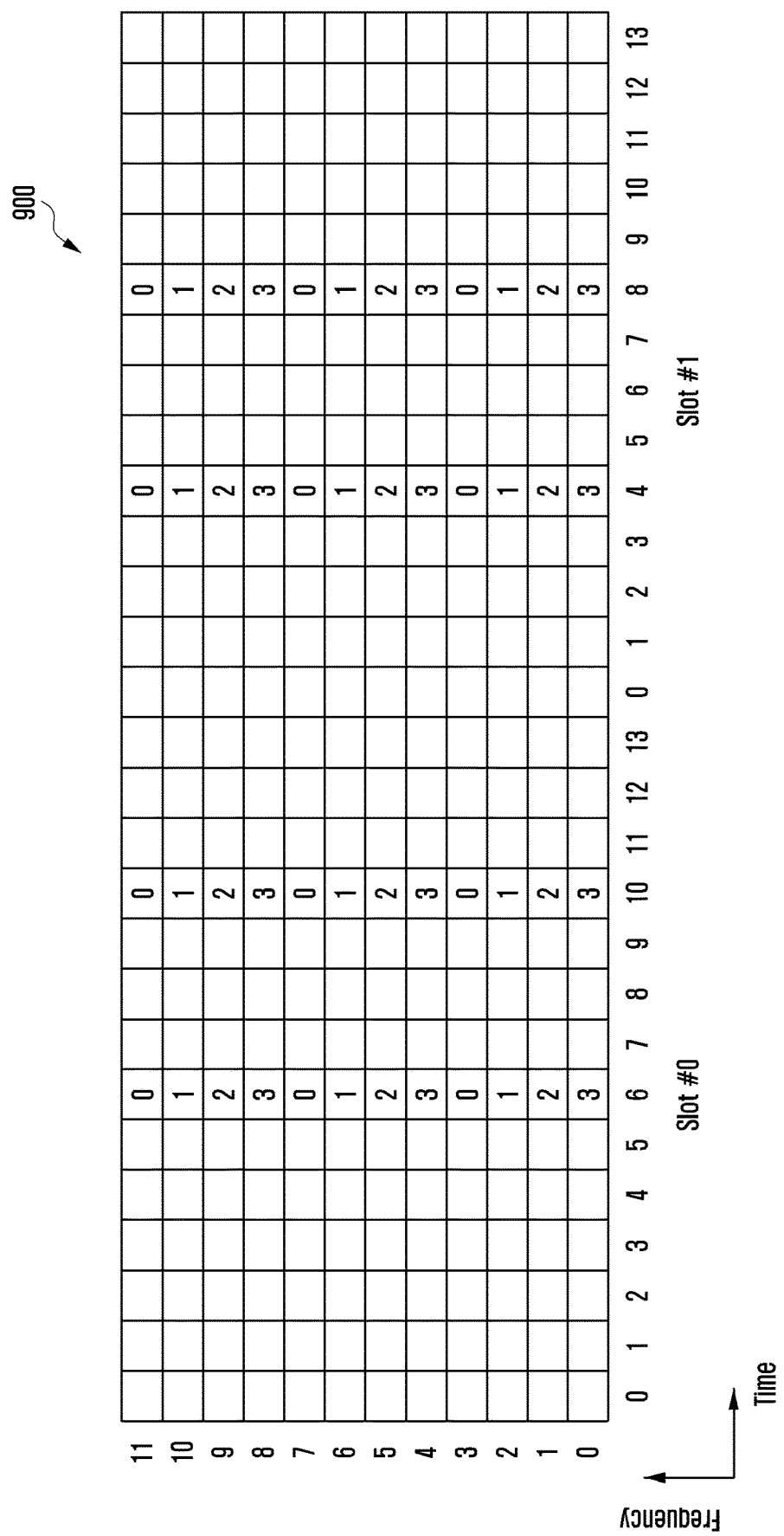

FIGS. 8 and 9 illustrate RE patterns of a TRS according to various embodiments of the disclosure.

Referring to FIGS. 8 and 9, TRS patterns 800 and 900 for when the TRS burst is X=1 and X=2 are illustrated. As shown in FIGS. 8 and 9, the TRS may have a frequency RE density of 3 RE/RB/ports, and the REs may be repeated in every 4 subcarriers (i.e., one TRS port is transmitted in one of the REs 0, 1, 2, and 3 shown in the TRS OFDM symbol REs in FIG. 8 or 9). In addition, according to some embodiments, the TRS may be transmitted in one of three OFDM symbol pairs of $\{5^{th}$ and $9^{th}\}$, $\{6^{th}$ and $10^{th}\}$, and $\{7^{th}$ and $11^{th}\}$ in the frequency band below 6 GHz, which is referred to as frequency range 1 (FR1), and may be transmitted in one of ten OFDM symbol pairs of $\{1^{st}$ and $5^{th}\}$, $\{2^{nd}$ and $6^{th}\}$, $\{3^{rd}$ and $7^{th}\}$, $\{4^{th}$ and $8^{th}\}$, $\{5^{th}$ and $9^{th}\}$, $\{6^{th}$ and $10^{th}\}$, $\{7^{th}$ and $11^{th}\}$, $\{8^{th}$ and $12^{th}\}$, $\{9^{th}$ and $13^{th}\}$, and $\{10^{th}$ and $14^{th}\}$ in the frequency band equal to or more than 6 GHz, which is referred to as frequency range 2 (FR2). It should be noted that the locations of OFDM symbols in FIGS. 8 and 9 are an example of the TRS configuration and the actual transmission locations may vary depending on the transmission of the base station.

Figure 10:
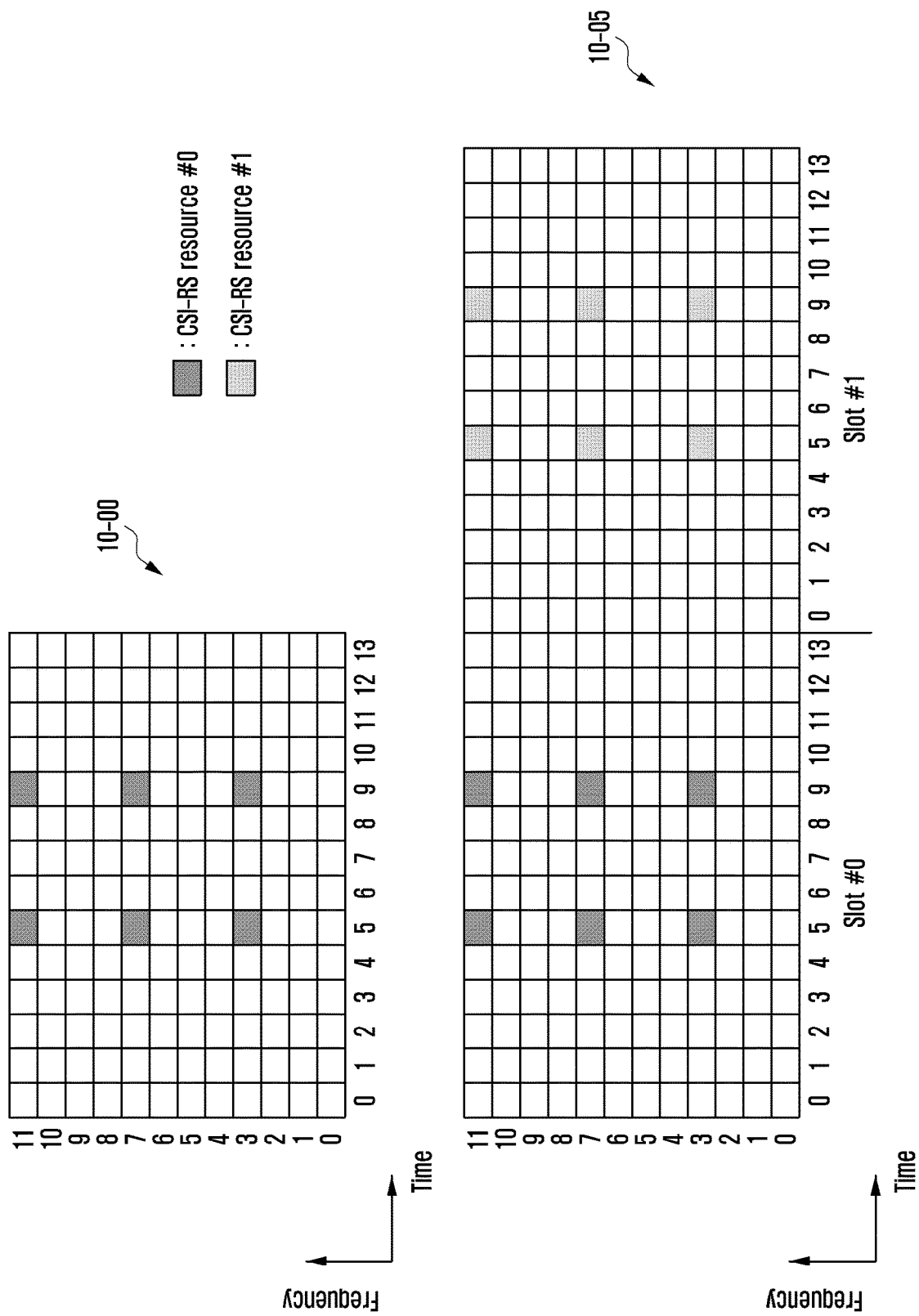
FIG. 10 illustrates a 1-Port CSI-RS configuration according to an embodiment of the disclosure.

FIG. 10 illustrates a 1-Port CSI-RS configuration according to an embodiment of the disclosure.

Referring to FIG. 10, FIG. 10 illustrates an example of 1-port CSI-RS configuration for covering the TRS RE patterns in FIGS. 8 and 9. According to FIG. 10, the base station may configure one resource set to one resource setting, and may configure up to two CSI-RS resources to the resource set. In this case, the frequency density of the CSI-RS may be set to 3 RE/RB/ports. If the TRS burst of X=1 is used, the base station may configure only CSI-RS resource #0 10-00, and if the TRS burst of X=2 is used, the base station may configure both CSI-RS resource #0 and CSI-RS resource #1 10-05. When the TRS burst of X=2, the base station may configure the CSI-RS-ResourceRep parameter to be ON such that the terminal is capable of performing continuous time/frequency tracking by assuming the same transmission beam for all 1-port CSI-RSs. As another example, if the CSI-RS resources are configured as the TRS, such as the case where there is no corresponding report setting (i.e., there is no report setting referring to the corresponding CSI-RS resource) or the case where it is explicitly configured that time/frequency tracking cannot be performed through the corresponding CSI-RS, it is possible to make a rule such that the terminal assumes that all the CSI-RS ports belonging to the CSI-RS resources are the same antenna port regardless of the configuration of the ResourceRep parameter for each CSI-RS resource.

Figure 11:
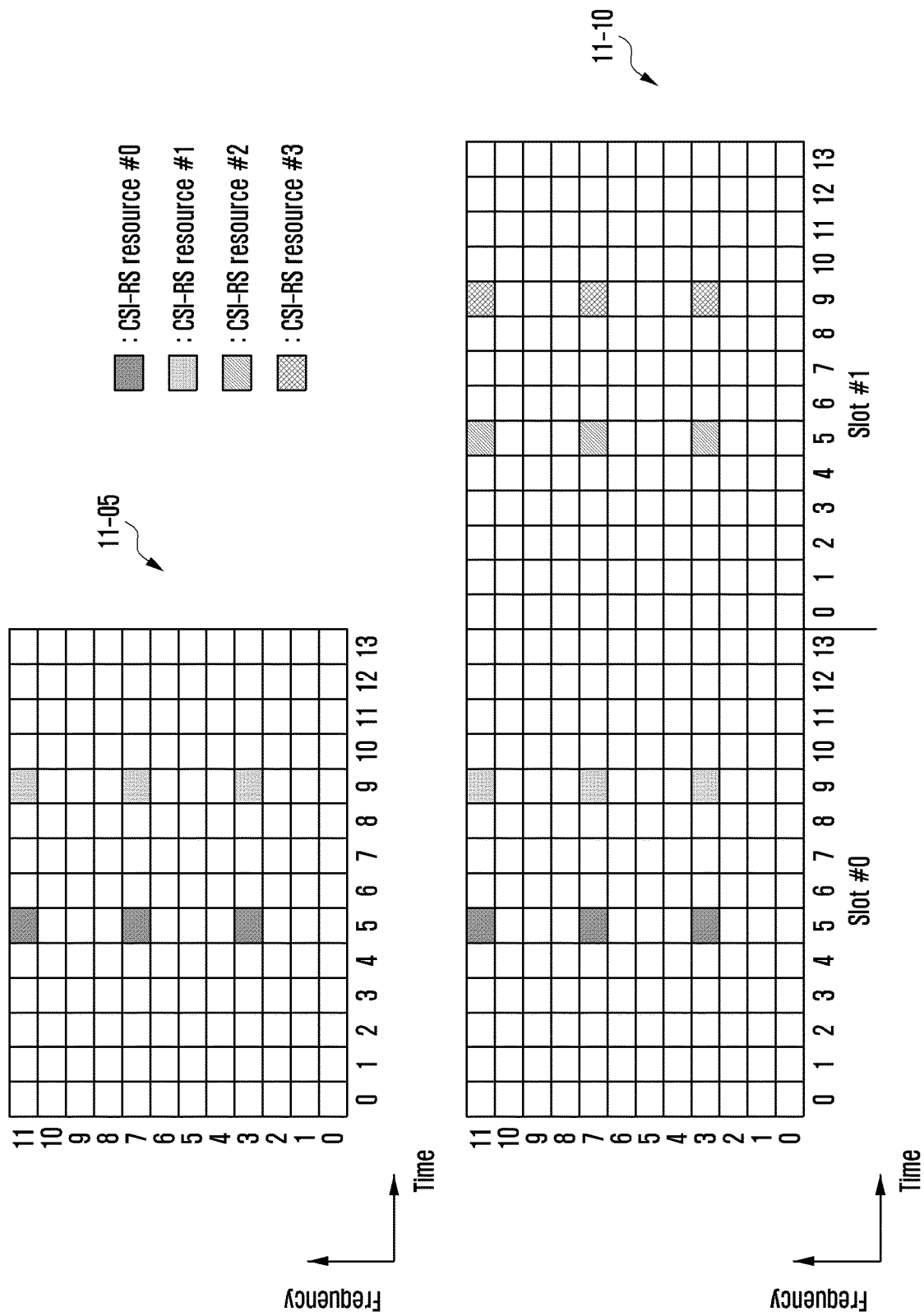
FIG. 11 illustrates a 1-Port CSI-RS configuration according to an embodiment of the disclosure.

FIG. 11 illustrates a 1-Port CSI-RS configuration according to an embodiment of the disclosure.

Referring to FIG. 11, FIG. 11 shows an example of 1-port CSI-RS configuration for covering the TRS RE patterns in FIGS. 8 and 9. According to FIG. 11, the base station may configure one resource set to one resource setting, and may configure up to four CSI-RS resources to the resource set. In this case, the frequency density of the CSI-RS may be set to 3 RE/RB/ports. If the TRS burst of X=1 is used, the base station may configure CSI-RS resources #0 and #1 11-05, and if the TRS burst of X=2 is used, the base station may configure all CSI-RS resources #0, #1, #2, and #3 11-10. In case of the TRS burst of X=1 or X=2, the base station may configure the CSI-RS-ResourceRep parameter to be ON such that the terminal is capable of performing continuous time/frequency tracking by assuming the same transmission beam for all 1-port CSI-RSs. As another example, if the CSI-RS resources are configured as the TRS, such as the case where there is no corresponding report setting (i.e., there is no report setting referring to the corresponding CSI-RS resource) or the case where it is explicitly configured that time/frequency tracking cannot be performed through the corresponding CSI-RS, it is possible to make a rule such that the terminal assumes that all the CSI-RS ports belonging to the CSI-RS resources are the same antenna port regardless of the configuration of the ResourceRep parameter for each CSI-RS resource.

The locations of the subcarriers and the locations of the OFDM symbols of the 1-port CSI-RS resources in FIGS. 10 and 11 may vary appropriately according to the locations of the TRS subcarriers in FIGS. 8 and 9.

The TRS may be transmitted in any of various forms such as periodic, semi-persistent, and aperiodic. The periodic TRS (P-TRS) is periodically transmitted until radio resource control (RRC) reconfiguration according to the period and slot offset value of RRC configuration. The semi-persistent TRS (SP-TRS) is transmitted after activation by the medium access control (MAC)-control element (CE) or downlink control information (DCI) based on the period and slot offset value of RRC configuration and before deactivation. The aperiodic TRS (A-TRS) is triggered and transmitted by the MAC CE or DCI without configuration of the period or slot offset value. The A-TRS triggering and the A-TRS transmission timing may have an offset configured in a higher layer, or may follow a predetermined value (for example, such that the A-TRS is transmitted in the same slot as that of the A-TRS triggering). Since it may be difficult to measure the statistical characteristics of a channel due to the insufficient number of time-axis REs in the aperiodic TRS (A-TRS), the aperiodic TRS may be associated with the periodic TRS or the semi-persistent TRS. The association between the A-TRS and the SP-TRS or the P-TRS may be supported by any of various methods such as quasi co-location (QCL). For example, the base station may configure at least one SP-TRS or P-TRS to the A-TRS as a QCL reference RS, thereby extracting channel statistic values, such as delay spread, average delay, Doppler spread, Doppler shift, and the like (QCL type A) or extracting spatial parameters, such as transmission (TX) beam, a reception (RX) beam, and the like (QCL type D).

In the NR system, the terminal may perform two-step time/frequency tracking with respect to a serving cell (or PCell). First, the terminal may perform initial time/frequency (TF) tracking (coarse TF tracking) on the basis of an SS/PBCH block (SSB). On the basis of the same, although the terminal cannot support the maximum modulation coding scheme (MCS) or maximum UE mobility, the terminal may receive a system information block (SIB), may perform paging, or may support the MCS and UE mobility to an appropriate degree, thereby receiving a PDSCH. Thereafter, the terminal may receive at least one piece of TRS configuration information from the base station in an RRC connected mode, may perform precise time/frequency tracking on the basis of the TRS, and may support the maximum MCS or the maximum UE mobility, thereby receiving a PDSCH having a high data rate.

In the NR system, the base station may change the transmission/reception band- or beam-related configuration of the terminal depending on the situation, and such a band or beam change may affect the statistical characteristics of the channel, so that the terminal may be required to re-perform the time/frequency tracking.

Secondary Cell (SCell) activation occurs when the base station allocates additional cells, as well as the PCell, to the terminal is a representative example of the above-mentioned terminal band change.

Figure 12:
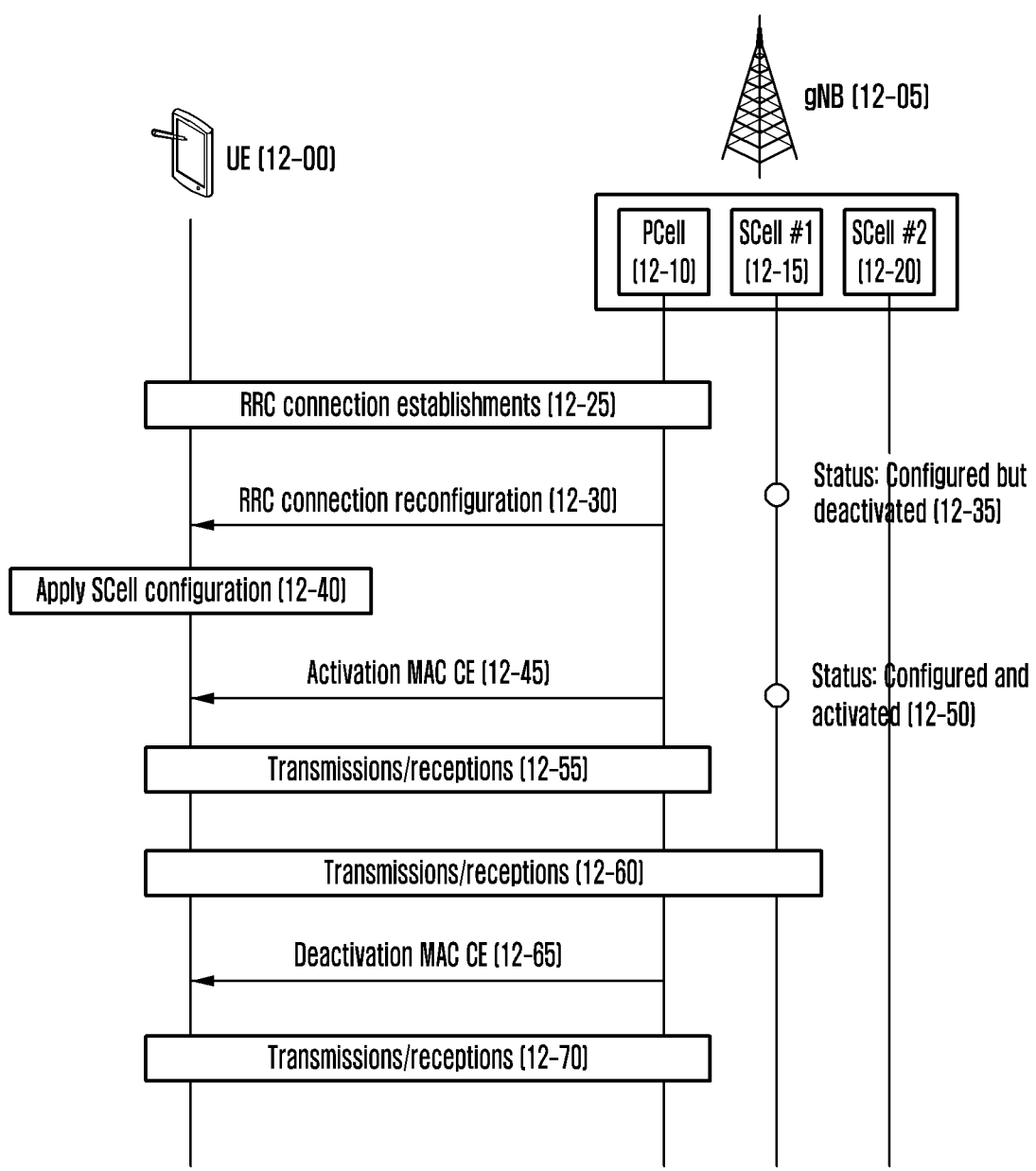
FIG. 12 illustrates a secondary cell (SCell) activation/deactivation procedure according to an embodiment of the disclosure.

FIG. 12 illustrates a SCell activation/deactivation procedure according to an embodiment of the disclosure.

Referring to FIG. 12, in operation 12-25, the base station 12-05 may initially establish an RRC connection with the terminal 12-00 through a PCell 12-10. Thereafter, in operation 12-30, the base station may reconfigure an RRC connection with the terminal, which includes configuration information related to one or more SCells 12-15 and 12-20. In this case, in operation 12-35, although the SCell 12-15 is configured to the terminal, it is not deactivated. Next, the terminal applies the configured SCell information in operation 12-40. Thereafter, the base station may instruct the terminal to activate specific SCells of the RRC-configured SCells through a MAC CE signaling in operation 12-45. The SCells are regarded as being configured and activated after the terminal receives the MAC CE signaling in operation 12-50. Next, the base station may instruct the terminal to transmit and receive data in the PCell in operation 12-55, or may instruct the terminal to transmit and receive data in the activated SCell in operation 12-60. If the base station instructs the terminal to deactivate the corresponding SCell through a MAC CE signaling in operation 12-65, the terminal may recognize that data is no longer transmitted in the corresponding SCell, and it is still possible for the base station to transmit and receive data in the PCell in operation 12-70.

Figure 13:
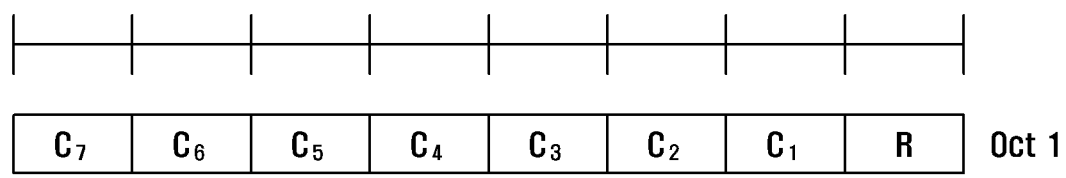
FIG. 13 illustrates a medium access control (MAC)-control element (CE) structure for SCell activation/deactivation according to an embodiment of the disclosure.

FIG. 13 illustrates a MAC CE for SCell activation/deactivation according to an embodiment of the disclosure.

Referring to FIG. 13, it is assumed that the base station performs signaling for up to 7 SCells using an 8-bit bitmap, and specific SCell IDs from $C_1$ to $C_7$ are assigned to the terminal, wherein the SCell of $C_i$=1 is activated and the SCell of $C_i$=0 is deactivated. If an SCell ID is not assigned to $C_i$, the terminal ignores the corresponding field $C_i$.

Bandwidth (BW) part (BWP) switching occurs when the base station assigns the terminal a reception area in a cell is another example of the terminal band change described above. In the NR system, the base station may configure initial BWP, which is a bandwidth of control resource set (CORESET) #0, to the terminal through a master information block (MIB). Thereafter, the base station may configure an initial BWP (first BWP) of the terminal through an RRC signaling, and may notify of at least one piece of BWP configuration information, which may be indicated through the DCI in the future. Thereafter, the base station may inform of a BWP ID through the DCI to indicate the band to be used by the terminal. If the terminal fails to receive the DCI through the currently assigned BWP for a specific period of time or more, the terminal returns to the default BWP and tries to receive the DCI.

Figure 14:
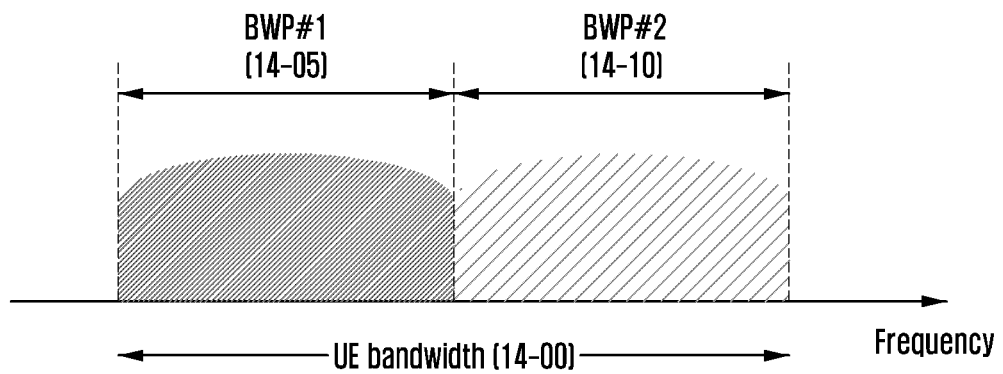
FIG. 14 illustrates an example of a bandwidth (BW) part (BWP) configuration according to an embodiment of the disclosure.

FIG. 14 illustrates an example of a bandwidth (BW) part (BWP) configuration according to an embodiment of the disclosure.

Referring to FIG. 14, illustrated is an example in which the terminal bandwidth 14-00 is configured with two bandwidth parts, such as bandwidth part #1 14-05 and bandwidth part #2 14-10. The base station may configure one or more bandwidth parts to the terminal, and may configure the following information for each bandwidth part.

TABLE 2

Configuration information 1: bandwidth of bandwidth part (number of PRBs constituting bandwidth part)
Configuration information 2: frequency location of bandwidth part (this information may be an offset value relative to a reference point, wherein the reference point may be, for example, center frequency of a carrier wave, a synchronization signal, a synchronization signal raster, or the like.)
Configuration information 3: configuration of bandwidth part (e.g., subcarrier spacing, cyclic prefix (CP) length, and the like)
Others In addition to the above configuration information, various parameters related to the bandwidth part may be configured to the terminal. The base station may transmit the above information to the terminal through a higher layer signaling (e.g., RRC signaling). At least one of the one or more configured bandwidth parts may be activated. The activation of the configured bandwidth part may be semi-statically transmitted from the base station to the terminal through an RRC signaling, or may be dynamically transmitted from the base station to the terminal through the MAC CE (control element) or DCI.

The configuration of the bandwidth parts supported by the 5G communication system may be used for various purposes.

For example, if the bandwidth supported by the terminal is smaller than the system bandwidth, the base station may support the terminal through the configuration of the bandwidth part. For example, in Table 2, the base station may configure the frequency location of the bandwidth part (configuration information 2) to the terminal, thereby allowing the terminal to transmit and receive data in a specific frequency location within the system bandwidth.

As another example, the base station may configure a plurality of bandwidth parts to the terminal for supporting different types of carrier configurations. For example, to support a terminal to transmit and receive data using subcarrier spacing of 15 kHz and subcarrier spacing of 30 kHz, the base station may configure the terminal such that two bandwidth parts use the subcarrier spacing of 15 kHz and the subcarrier spacing of 30 kHz, respectively. Different bandwidth parts may be frequency division multiplexed (FDM), and when transmitting and receiving data with specific subcarrier spacing, the bandwidth part configured with the corresponding subcarrier spacing may be activated.

As another example, to reduce power consumption of the terminal, the base station may configure bandwidth parts having different bandwidths to the terminal. For example, if the terminal supports a very large bandwidth (e.g., a bandwidth of 100 MHz), always transmits/receives data with the 100 MHz bandwidth may cause very high power consumption. In particular, it is very inefficient in terms of power consumption for the terminal to monitor the unnecessary downlink control channel for a large bandwidth of 100 MHz when there is no traffic. Therefore, reduce the power consumption of the terminal, the base station may configure a bandwidth part of a relatively small bandwidth (e.g., a bandwidth part of 20 MHz) to the terminal. If there is no traffic, the terminal may perform the monitoring operation in the bandwidth part of 20 MHz, and if traffic occurs, the terminal may transmit and receive data using the 100 MHz bandwidth part in response to the instruction of the base station.

Figure 15:
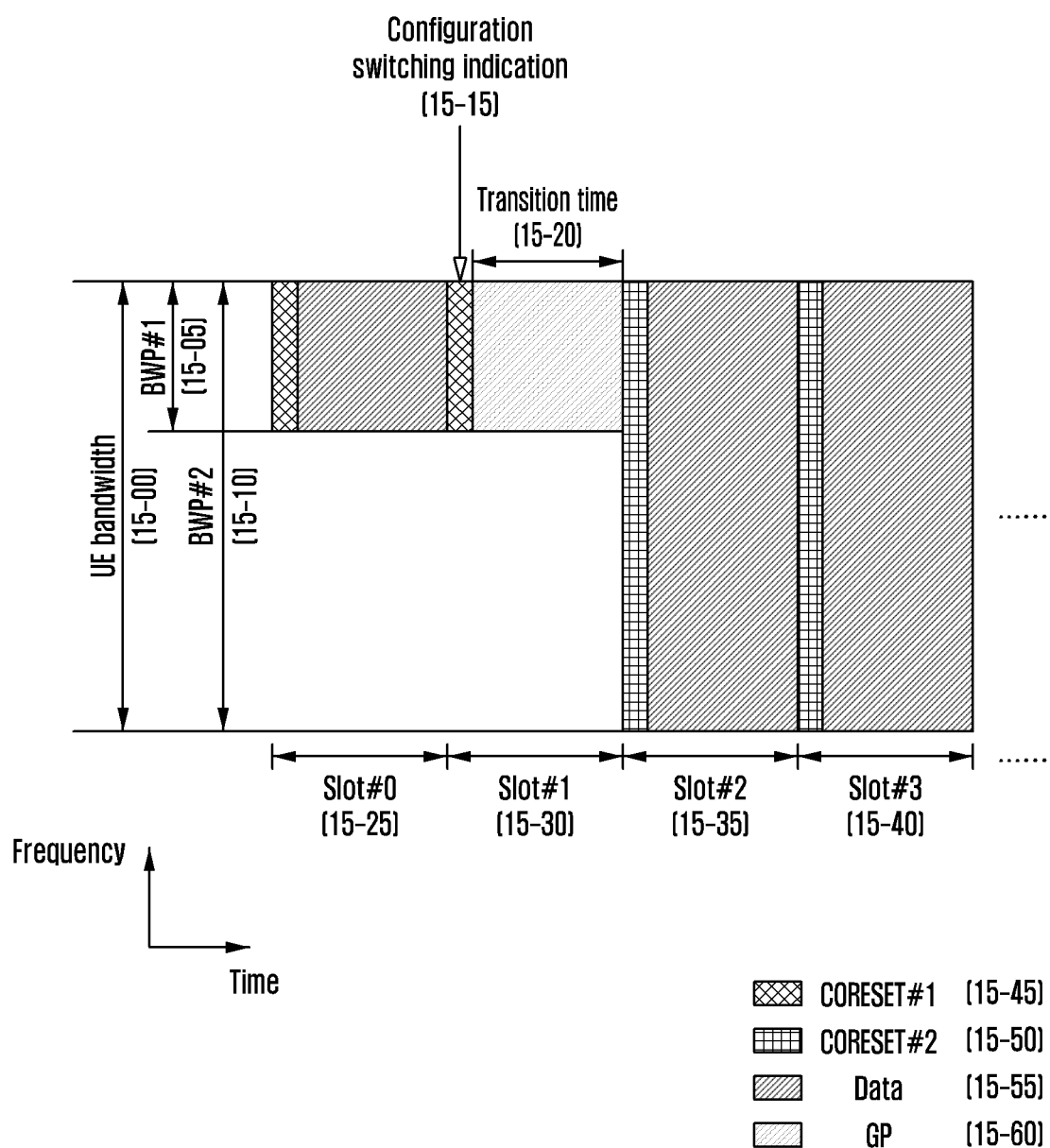
FIG. 15 illustrates a BWP change instruction procedure according to an embodiment of the disclosure.

FIG. 15 illustrates a BWP change instruction procedure according to an embodiment of the disclosure.

As described in Table 2, the base station may configure one or more bandwidth parts to the terminal, and may inform the terminal of information about the bandwidth of the bandwidth part, the frequency location of the bandwidth part, the configuration of the bandwidth part, and the like for configuration of each bandwidth part.

Referring to FIG. 15, an example in which a terminal is configured with two bandwidth parts (i.e., bandwidth part (BWP) #1 15-05 and BWP #2 15-10) in the terminal bandwidth 15-00 is illustrated. One or more bandwidth parts of the configured bandwidth parts may be activated, and FIG. 15 shows an example in which one bandwidth part is activated. In FIG. 5, bandwidth part #1 15-05, is in an active state in slot #0 15-25, and the terminal may monitor a physical downlink control channel (PDCCH) in control area #1 (or, CORESET #1) 15-45 in which bandwidth part #1 15-05 is configured, and may transmit and receive data 15-55 in bandwidth part #1 15-05. The control area in which the terminal receives the PDCCH may be different depending on the activated bandwidth part and thus the bandwidth for monitoring the PDCCH by the terminal may vary.

The base station may further transmit, to the terminal, an indicator for changing the configuration of the bandwidth part. The changing the configuration of the bandwidth part may activate a specific bandwidth part (for example, switching the activation from a bandwidth part A to a bandwidth part B). The base station may transmit a configuration switching indicator to the terminal in a specific slot. Upon receiving the configuration switching indicator from the base station, the terminal may apply a configuration based on the configuration switching indicator at or after a specific time point, thereby determining a bandwidth part to be activated, and may monitor the PDCCH in the control area configured in the activated bandwidth part.

In FIG. 15, the base station may transmit, to the terminal, a configuration switching indicator 15-15 instructing the terminal to switch the activated bandwidth part from existing bandwidth part #1 15-05 to bandwidth part #2 15-10 in slot #1 15-30. Upon receiving the indicator, the terminal may activate bandwidth part #2 15-10 according to the content of the indicator. In this case, a transition time 15-20 for switching the bandwidth part may be required, and a time point at which the bandwidth part to be activated is switched and applied may be determined according to the transition time. FIG. 15 shows the case where a transition time 15-20 of one slot (or, guard period (GP)) elapses after receiving the configuration switching indicator 15-15. Data transmission and/or reception may not be performed during the transition time 15-60. Accordingly, bandwidth part #2 15-10 may be activated in slot #2 15-35, and the operation of transmitting/receiving the control channel and data may be performed through the corresponding bandwidth part.

The base station may preconfigure one or more bandwidth parts to the terminal through a higher layer signaling (for example, an RRC signaling), and may instruct activation in such a manner that the configuration switching indicator 15-15 is mapped with one of the bandwidth part configurations, which was preconfigured by the base station. For example, an indicator of $\log_2 N$ bits may select and indicate one of the N preconfigured bandwidth parts. Table 3 below shows an example of indicating the configuration information for the bandwidth part using a 2-bit indicator.

TABLE 3

| Indicator values | Configuration of bandwidth part |
|---|---|
| 00 | Bandwidth configuration A configured through higher layer signaling |
| 01 | Bandwidth configuration B configured through higher layer signaling |
| 10 | Bandwidth configuration C configured through higher layer signaling |
| 11 | Bandwidth configuration D configured through higher layer signaling |

The configuration switching indicator 15-15 for the bandwidth part described above may be transmitted from the base station to the terminal in the form of a medium access control (MAC) control component (CE) signaling or an L1 signaling (e.g., common DCI, group-common DCI, or terminal-specific DCI).

The time point for applying the activation of the bandwidth part according to the configuration switching indicator 15-15 for the bandwidth part described above may be determined as follows. The time point for applying the configuration change may follow a predefined value (e.g., the configuration change may be applied N (≥1) slots after receiving the configuration switching indicator), may be configured through a higher layer signaling (e.g., an RRC signaling) from the base station to the terminal, or may be included in the content of the configuration switching indicator 15-15 to then be transmitted. Alternatively, the time point for applying the configuration change may be determined by combinations of the above methods. Upon receiving the configuration switching indicator 15-15 for the bandwidth part, the terminal may apply the change configuration at or after the time point obtained through the above methods.

In the disclosure, band or beam changes, such as SCell activation, BWP switching, TX/RX beam change, and the like, which may affect time/frequency tracking of the terminal, will be collectively referred to as BW/beam adaptation.

As described above, since the number of samples of the TRS REs on the time-axis affects the estimation accuracy in time/frequency tracking of the terminal, it may be preferable to use a P-TRS, which is transmitted periodically, if possible. However, if a new TRS is required for some reason, such as a long transmission period of the P-TRS or the BW/beam adaptation of the terminal (i.e., if a new time/frequency tracking process is required due to a change in the statistical characteristics of the channel), relying only on the P-TRS may increase latency to be greater than the RRC reconfiguration time. The following embodiments provide detailed methods of operating the SP-TRS or A-TRS according to the BW/beam adaptation of the terminal to improve latency.

First Embodiment: Method 1 for Determining Whether or Not to Transmit TRS According to BW/Beam Adaptation As described above, although a new time/frequency tracking process may be required because the BW/beam adaptation of the terminal affects the statistical characteristics of the channel, this is not an inevitable phenomenon, and may be determined based on several conditions. An important example of the above conditions is the band difference (B) between a band BW #1 before switching and a band BW #2 after switching in the terminal.

Figure 16:
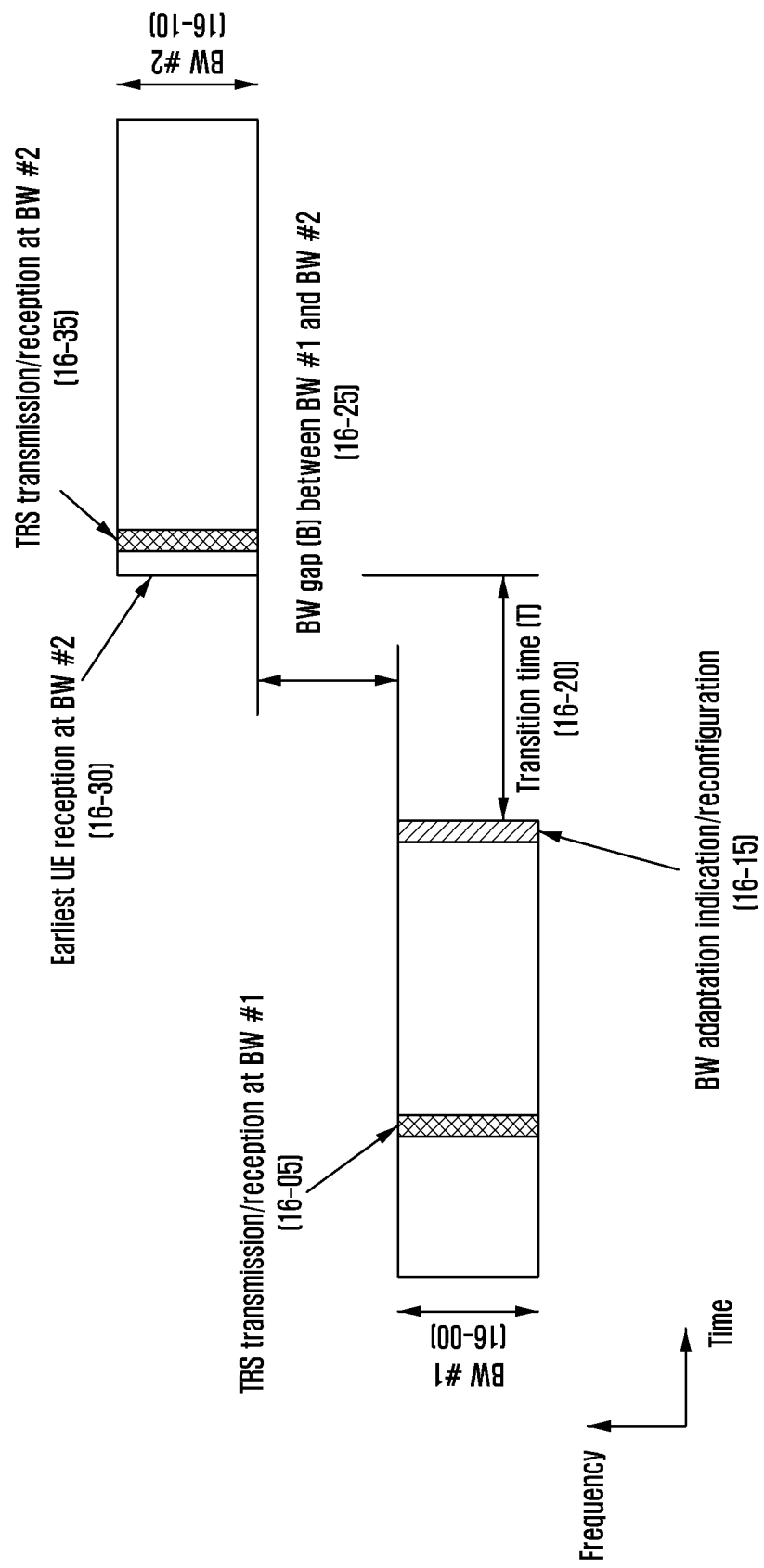
FIG. 16 illustrates an example of tracking reference signal (TRS) transmission according to a BW change according to an embodiment of the disclosure.

FIG. 16 illustrates an example of TRS transmission/reception according to a BW change according to an embodiment of the disclosure.

Referring to FIG. 16, the terminal is transmitting and receiving data in a first band BW #1 16-00 and is performing time/frequency tracking based on the TRS 16-05 configured in the first band. The TRS 16-05 transmitted in the first band may be a P-TRS or an SP-TRS. If the base station instructs or re-establishes BW adaptation, such as SCell activation, BWP switching, or the like at operation 16-15, the terminal may begin to receive data in a switched second band BW #2 16-10 after a minimum transition time (T) 16-20, which is predetermined or reported by a UE capability signaling at operation 16-30. In this case, if the bandwidth difference (B) 16-25 between the first band and the second band is predetermined in the standard or is greater than a threshold ($\gamma_B$) configured through a higher layer (B>$\gamma_B$), the terminal may recognize that the existing time/frequency tracking cannot be applied to the new band and may assume that the base station will transmit a TRS 16-35 for the switched second band. This allows the base station to reduce the TRS transmission load if the frequency interval between the first band and the second band is sufficiently small so that the time/frequency tracking in the first band is still valid in the second band. The TRS 16-35 of the second band may be an SP-TRS or an A-TRS, and methods for activation or triggering when the transmission conditions are satisfied will be specifically provided in the embodiments below. Although the difference in the bandwidth (B) 16-25 between the first band and the second band is expressed as the frequency axis distance between the first band and the second band (e.g., the number of PRBs or the number of subcarriers between the end portion of the first band and the start portion of the second band) in FIG. 16, this is only an example, and in actual application, various methods, such as the frequency axis distance between the start portion of the first band and the start portion of the second band, the difference between the bandwidth of the first band and the bandwidth of the second band, and the like, may be applied. The first receivable time point 16-30 of the terminal in the second band and the first TRS reception time point 16-35 in the second band may have a rule so as to have a specific relationship (e.g., a slot offset), and, for example, they may be configured to exist in the same slot.

If the TRS transmission conditions due to the BW/beam adaptation are satisfied or are expected to be satisfied, the terminal should receive at least one A-TRS RRC configuration or MAC CE signaling for the switched second band.

If the A-TRS is not triggered or the SP-TRS is not activated in the switched second band even though the TRS transmission conditions due to the BW/beam adaptation are satisfied, the terminal may operate in the second band based on the existing time/frequency tracking process in the first band.

It is possible to instruct whether or not the A-TRS or the SP-TRS is transmitted in the switched second band according to the above conditions through a higher layer signaling. For example, when an instruction by a 1-bit RRC signaling says that the A-TRS or the SP-TRS transmission is not supported in the switched second band, even if the TRS transmission conditions are satisfied, the base station does not transmit the TRS in the switched second band. On the other hand, when an instruction by the 1-bit RRC signaling indicates that the A-TRS or the SP-TRS transmission is supported in the switched second band, if the TRS transmission conditions are satisfied, the base station transmits the TRS in the switched second band.

It is also possible to implicitly determine whether the A-TRS or the SP-TRS is transmitted in the switched second band according to the above conditions by other RRC parameters such as TRS configuration, threshold configuration, and the like. For example, if a threshold for the conditions is not configured, the base station does not transmit the TRS in the switched second band even if the TRS transmission conditions are satisfied. On the other hand, if a threshold for the conditions is configured, if the TRS transmission conditions are satisfied, the base station transmits the TRS in the switched second band.

Since the TRS configuration and the threshold configuration for applying the embodiment may require different values to be used for different bands, the TRS configuration and the threshold configuration may be configured for each BWP or cell.

Although it has been described that the embodiment may be applied to overall band switching operations, such as SCell activation, BWP switching, and the like, for the convenience of explanation, the embodiment may be applied only to some of the above operations, or different embodiments may be applied to the respective operations in actual application. For example, it is possible to transmit the TRS in the switched second band based on the threshold in BWP switching and to transmit the TRS in the switched second band regardless of the threshold value in SCell activation.

Second Embodiment: Method 2 for Determining Whether or Not to Transmit TRS According to BW/Beam Adaptation As described above, although a new time/frequency tracking process may be required because the BW/beam adaptation of the terminal affects the statistical characteristics of the channel, this is not an inevitable phenomenon, and may be determined depending on several conditions. An important example of the above conditions is the time difference ($T_{TRS}$) between the (final) time point of time/frequency tracking of the terminal in the first band BW #1 before switching and the start time point of the second band BW #2 after switching.

Figure 17:
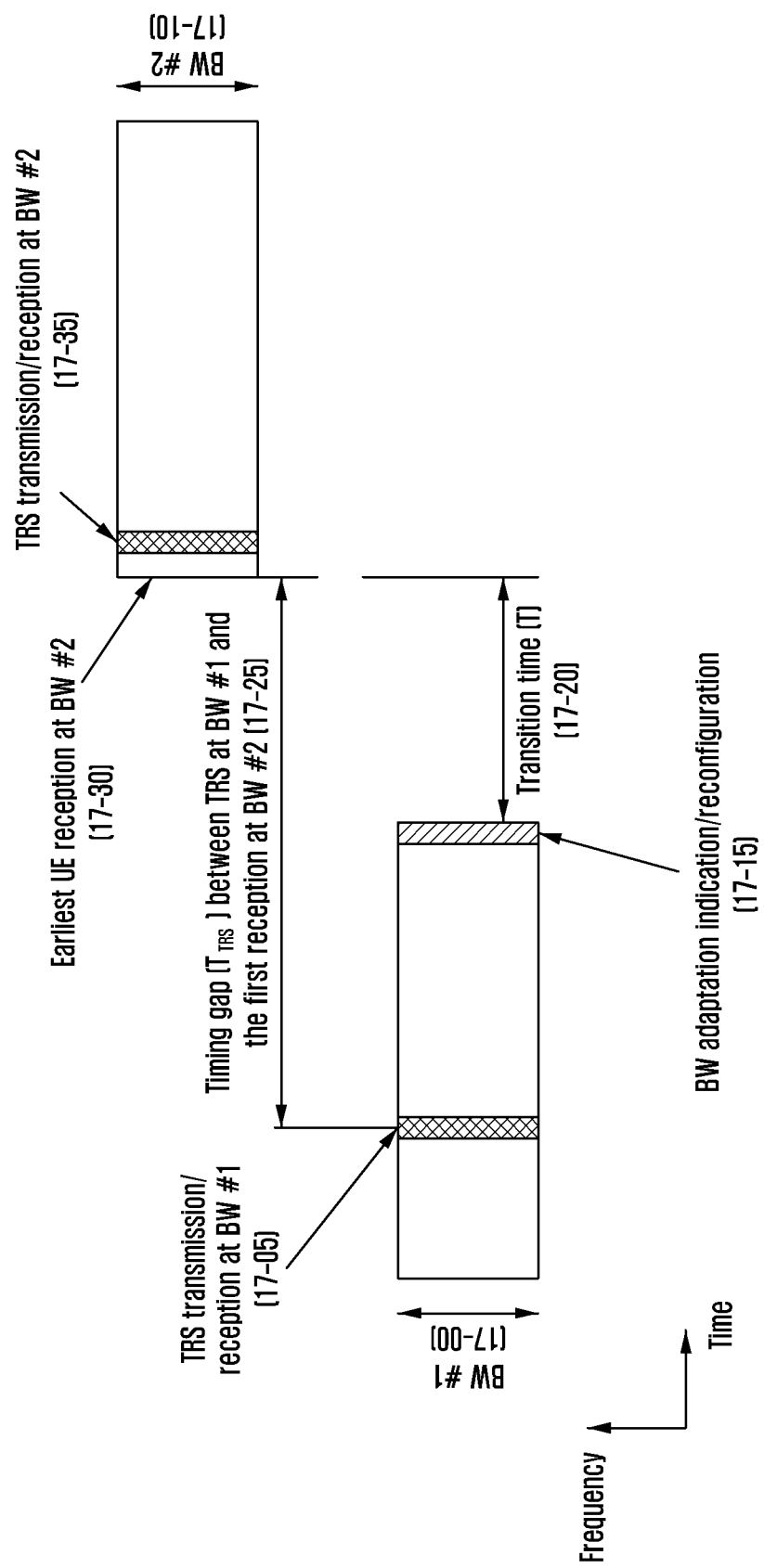
FIG. 17 illustrates another example of TRS transmission according to a BW change according to an embodiment of the disclosure.

FIG. 17 illustrates another example of TRS transmission according to an embodiment of the disclosure.

Referring to FIG. 17, the terminal is transmitting and receiving data in a first band BW #1 17-00 and is performing time/frequency tracking based on a TRS 17-05 that is configured in the first band. The TRS 17-05 may be a P-TRS or an SP-TRS. If the base station instructs or re-establishes BW adaptation, such as SCell activation, BWP switching, or the like at operation 17-15, the terminal may begin to receive data in a switched second band BW #2 17-10 after a minimum transition time (T) 17-20, which is predetermined or reported by a UE capability signaling at operation 17-30. In this case, if the time difference ($T_{TRS}$) 17-25 between the last TRS reception time point in the first band 17-05 and the first reception time point in the second band 17-30 is predetermined in the standard or is greater than a threshold ($\gamma_T$) that is configured in a higher layer ($T_{TRS} > \gamma_T$), the terminal may recognize that the time/frequency tracking by the TRS 17-05 configured in the first band is outdated, and may assume that the base station will transmit a TRS 17-35 for the switched second band. This allows the base station to reduce the TRS transmission load if the time interval for switching the band from the time/frequency tracking in the first band to the second band is sufficiently short so that the time/frequency tracking in the first band is still valid in the second band. The TRS 17-35 of the second band may be an SP-TRS or an A-TRS, and methods for activation or triggering when the transmission conditions are satisfied will be specifically described below. Although the time difference ($T_{TRS}$) 17-25 between the first band and the second band is expressed as the time axis distance between the last TRS in the first band and the first receivable time point in the second band (e.g., the number of OFDM symbols or the number of slots between the last TRS OFDM symbol of the first band and the start symbol of the second band) in FIG. 17, this is only an example, and in actual application, various methods, such as the time difference between the last TRS transmission time point in the first band and the first scheduling in the second band, the time difference between bandwidth change instruction time point in the first band and the first scheduling in the second band, and the like, may be applied. The first receivable time point 17-30 of the terminal in the second band and the first TRS reception time point 17-35 in the second band may have a rule so as to have a specific relationship (e.g., a slot offset), and, for example, they may be configured to exist in the same slot.

If the TRS transmission conditions due to the BW/beam adaptation are satisfied or are expected to be satisfied, the terminal should receive at least one A-TRS RRC configuration or MAC CE signaling for the switched second band.

If the A-TRS is not triggered or the SP-TRS is not activated in the switched second band even though the TRS transmission conditions due to the BW/beam adaptation are satisfied, the terminal may operate in the second band on the basis of the existing time/frequency tracking process in the first band before switching.

It is possible to instruct whether or not the A-TRS or the SP-TRS is transmitted in the switched second band according to the above conditions by a higher layer signaling. For example, when an instruction by a 1-bit RRC signaling says that the A-TRS or the SP-TRS transmission is not supported in the switched second band, even if the TRS transmission conditions are satisfied, the base station does not transmit the TRS in the switched second band. On the other hand, when an instruction by the 1-bit RRC signaling says that the A-TRS or the SP-TRS transmission is supported in the switched second band, if the TRS transmission conditions are satisfied, the base station transmits the TRS in the switched second band.

It is also possible to implicitly determine whether or not the A-TRS or the SP-TRS is transmitted in the switched second band according to the above conditions by other RRC parameters such as TRS configuration, threshold configuration, and the like. For example, if a threshold for the conditions is not configured, the base station does not transmit the TRS in the switched second band even if the TRS transmission conditions are satisfied. On the other hand, if a threshold for the conditions is configured, and if the TRS transmission conditions are satisfied, the base station transmits the TRS in the switched second band.

Since the TRS configuration and the threshold configuration for applying the embodiment may require different values to be used for different bands, the TRS configuration and the threshold configuration may be configured for each BWP or cell.

Although it has been described that the embodiment may be applied to overall band switching operations, such as SCell activation, BWP switching, and the like, for the convenience of explanation, the embodiment may be applied only to some of the above operations, or different embodiments may be applied to the respective operations in actual application. For example, it is possible to transmit the TRS in the switched second band on the basis of the threshold in BWP switching and to transmit the TRS in the switched second band regardless of the threshold value in SCell activation.

Third Embodiment: Method 3 for Determining Whether or Not to Transmit TRS According to BW/Beam Adaptation As described above, although a new time/frequency tracking process may be required because the BW/beam adaptation of the terminal affects the statistical characteristics of the channel, this is not an inevitable phenomenon, and may be determined based on several conditions. An important example of the above conditions is the time difference ($T_{TRS}$) between the (final) time point of time/frequency tracking of the terminal in the beam (beam #1) before switching and the start time point of the beam (beam #2) after switching.

Figure 18:
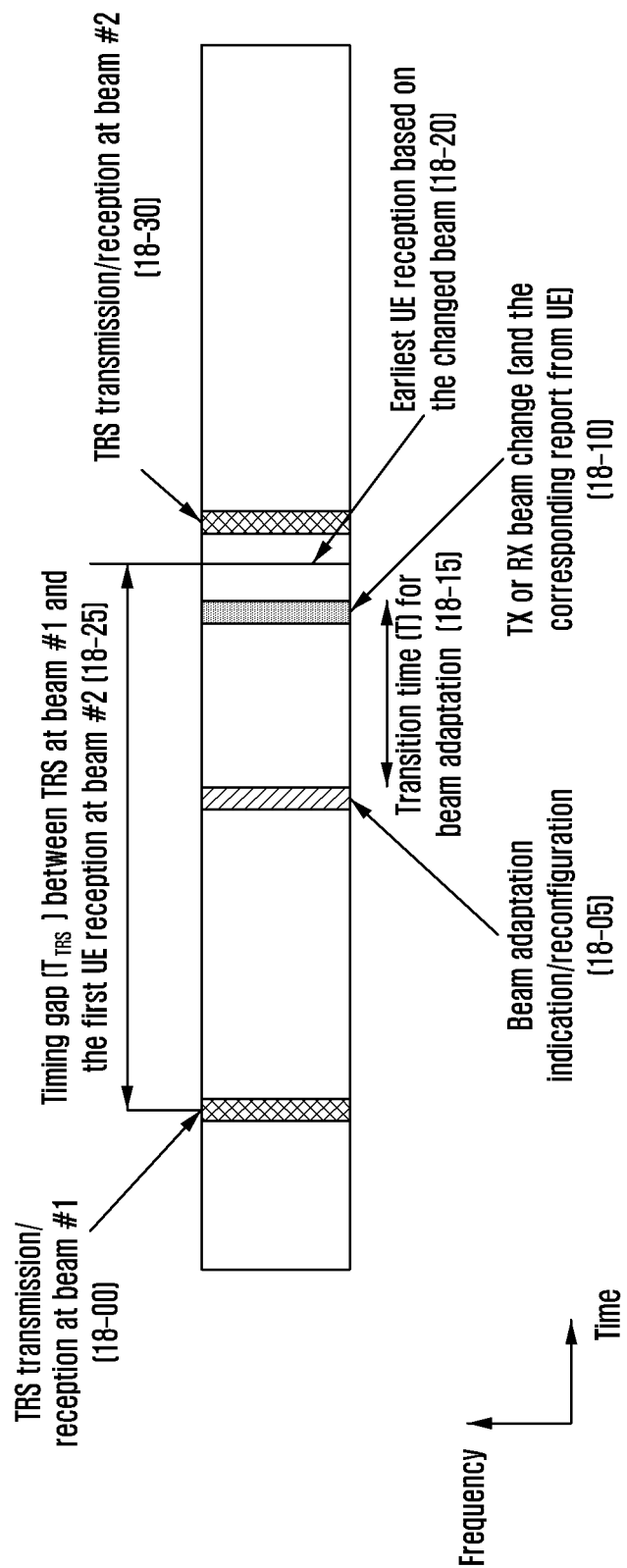
FIG. 18 illustrates an example of TRS transmission according to a beam change according to an embodiment of the disclosure.

FIG. 18 illustrates an example of TRS transmission according to a beam change according to an embodiment of the disclosure.

Referring to FIG. 18, the terminal is transmitting and receiving data in a first beam (beam #1) and is performing time/frequency tracking on the basis of a TRS 18-00 configured in the first beam. The TRS 18-00 transmitted through the first beam may be a P-TRS or an SP-TRS. If the base station instructs or re-establishes beam adaptation through an SSB indicator, a CSI-RS indicator, an SRS indicator, or the like at operation 18-05, the terminal may begin to receive data in a switched second beam (beam #2) after the minimum transition time (T) 18-15, which is predetermined or reported by a UE capability signaling at operation 18-20. In this case, the terminal may report the completion of TX/RX beam switching to the base station at operation 18-10. If the time difference ($T_{TRS}$) 18-25 between the last TRS reception time point in the first beam 18-00 and the first reception time point in the second beam 18-20 is predetermined in the standard or is greater than a threshold ($\gamma_{beam}$) configured in a higher layer ($T_{TRS} > \gamma_{beam}$), the terminal may recognize that the time/frequency tracking by the TRS 18-00 configured in the first beam is outdated, and may assume that the base station will transmit a TRS 18-30 for the switched second beam. This allows the base station to reduce the TRS transmission load if the time interval for switching the beam from the time/frequency tracking in the first beam to the second beam is sufficiently short so that the time/frequency tracking in the first beam is still valid in the second beam. The TRS 18-30 of the second beam may be an SP-TRS or an A-TRS, and methods for activation or triggering when the transmission conditions are satisfied will be specifically provided in the following embodiments. Although time difference ($T_{TRS}$) 18-25 between the first beam and the second beam is expressed as the time axis distance between the last TRS in the first beam and the first receivable time point in the second beam (e.g., the number of OFDM symbols or the number of slots between the last TRS OFDM symbol in the first beam and the start symbol in the second beam) in FIG. 18, this is only an example, and in practical application, various methods, such as the time difference between the last TRS transmission time point in the first beam and the first scheduling in the second beam, the time difference between beam switching instruction time point in the first beam and the first scheduling in the second beam, and the like, may be applied. The first receivable time point 18-20 of the terminal in the second beam and the first TRS reception time point 18-30 in the second beam may have a rule so as to have a specific relationship (e.g., a slot offset), and, for example, they may be configured to exist in the same slot.

If the TRS transmission conditions due to the BW/beam adaptation are satisfied or are expected to be satisfied, the terminal should receive at least one A-TRS RRC configuration or MAC CE signaling for the switched second beam.

If the A-TRS is not triggered or the SP-TRS is not activated in the switched second beam even though the TRS transmission conditions due to the BW/beam adaptation are satisfied, the terminal may operate in the second beam on the basis of the existing time/frequency tracking process in the first beam before switching.

It is possible to instruct whether or not the A-TRS or the SP-TRS is transmitted in the switched second beam according to the above conditions by a higher layer signaling. For example, when an instruction by a 1-bit RRC signaling says that the A-TRS or the SP-TRS transmission is not supported in the switched second beam, even if the TRS transmission conditions are satisfied, the base station does not transmit the TRS in the switched second beam. On the other hand, when an instruction by the 1-bit RRC signaling says that the A-TRS or the SP-TRS transmission is supported in the switched second beam, if the TRS transmission conditions are satisfied, the base station transmits the TRS in the switched second beam.

It is also possible to implicitly determine whether or not the A-TRS or the SP-TRS is transmitted in the switched second beam according to the above conditions by other RRC parameters such as TRS configuration, threshold configuration, and the like. For example, if a threshold for the conditions is not configured, the base station does not transmit the TRS in the switched second beam even if the TRS transmission conditions are satisfied. On the other hand, if a threshold for the conditions is configured, and if the TRS transmission conditions are satisfied, the base station transmits the TRS in the switched second beam.

Since the TRS configuration and the threshold configuration for applying the embodiment may require different values to be used for different beams, the TRS configuration and the threshold configuration may be configured for each BWP or cell.

Although it has been described that the embodiment can be applied to overall beam switching operations, such as SCell activation, BWP switching, and the like, for the convenience of explanation, the embodiment may be applied only to some of the above operations, or different embodiments may be applied to the respective operations in actual application. For example, it is possible to transmit the TRS in the switched second beam on the basis of the threshold in CSI-RS level beam switching and to transmit the TRS in the switched second beam regardless of the threshold value in SSB level beam switching.

Figure 19:
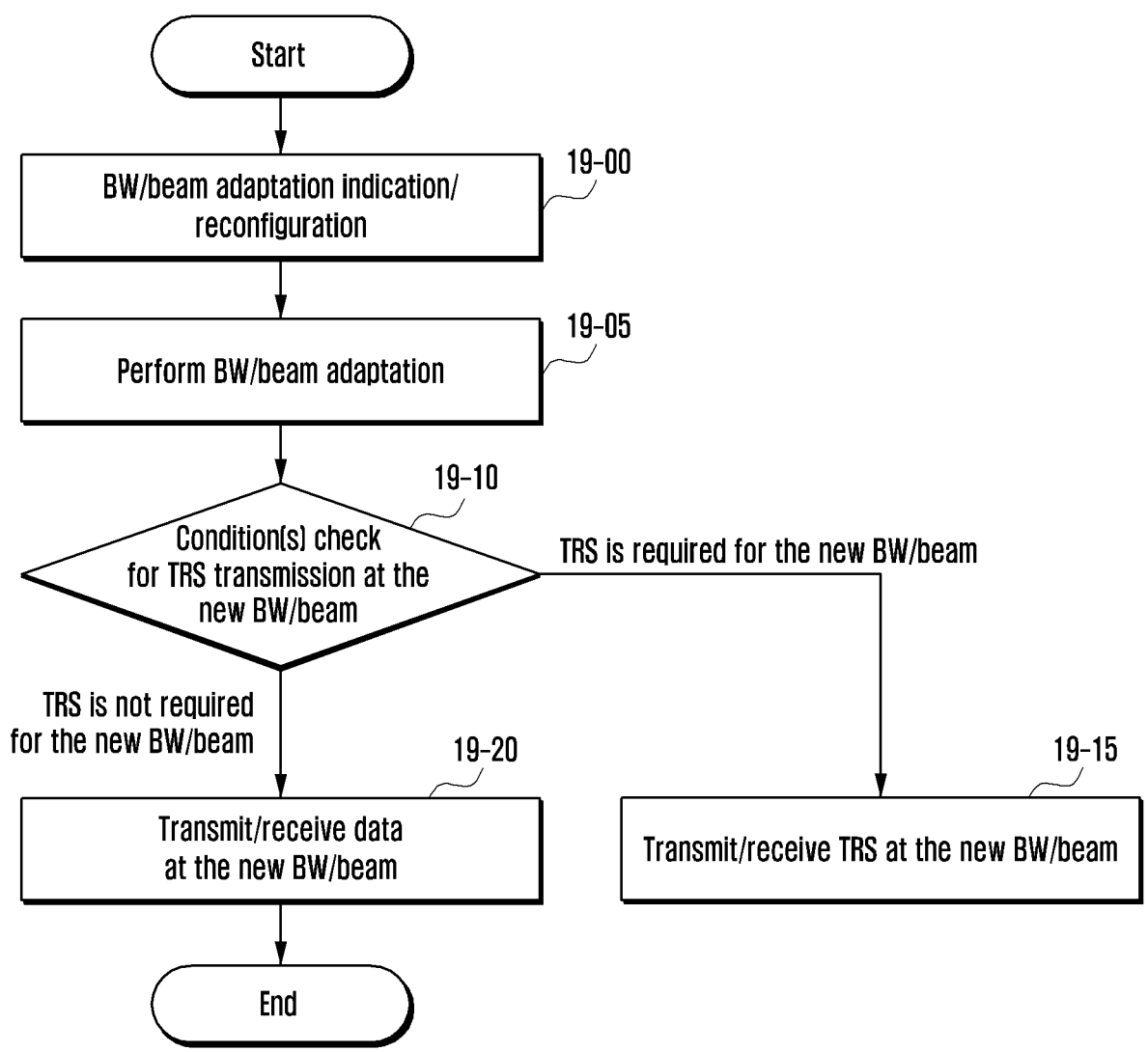
FIG. 19 is a flowchart of a TRS transmission procedure according to a BW or beam change according to an embodiment of the disclosure.

FIG. 19 is a flowchart of a TRS transmission procedure according to a BW or beam change according to an embodiment of the disclosure.

Referring to FIG. 19, the terminal receives a BW/beam adaptation indication/reconfiguration 19-00 from the base station and performs the same at operation 19-05. The terminal determines whether or not to transmit a TRS for the band or beam changed according to the embodiments 1 to 3 at operation 19-10, and if the TRS transmission is required, the terminal and the base station transmit/receive the TRS in the changed band or beam at operation 19-15. Thereafter, the base station and the terminal may transmit and receive data in the changed band or beam at operation 19-20.

Fourth Embodiment: Signaling Method for BWP Switching and TRS Transmission/Reception The embodiment provides a detailed signaling method according to at least one of the first to third embodiments.

Figure 20:
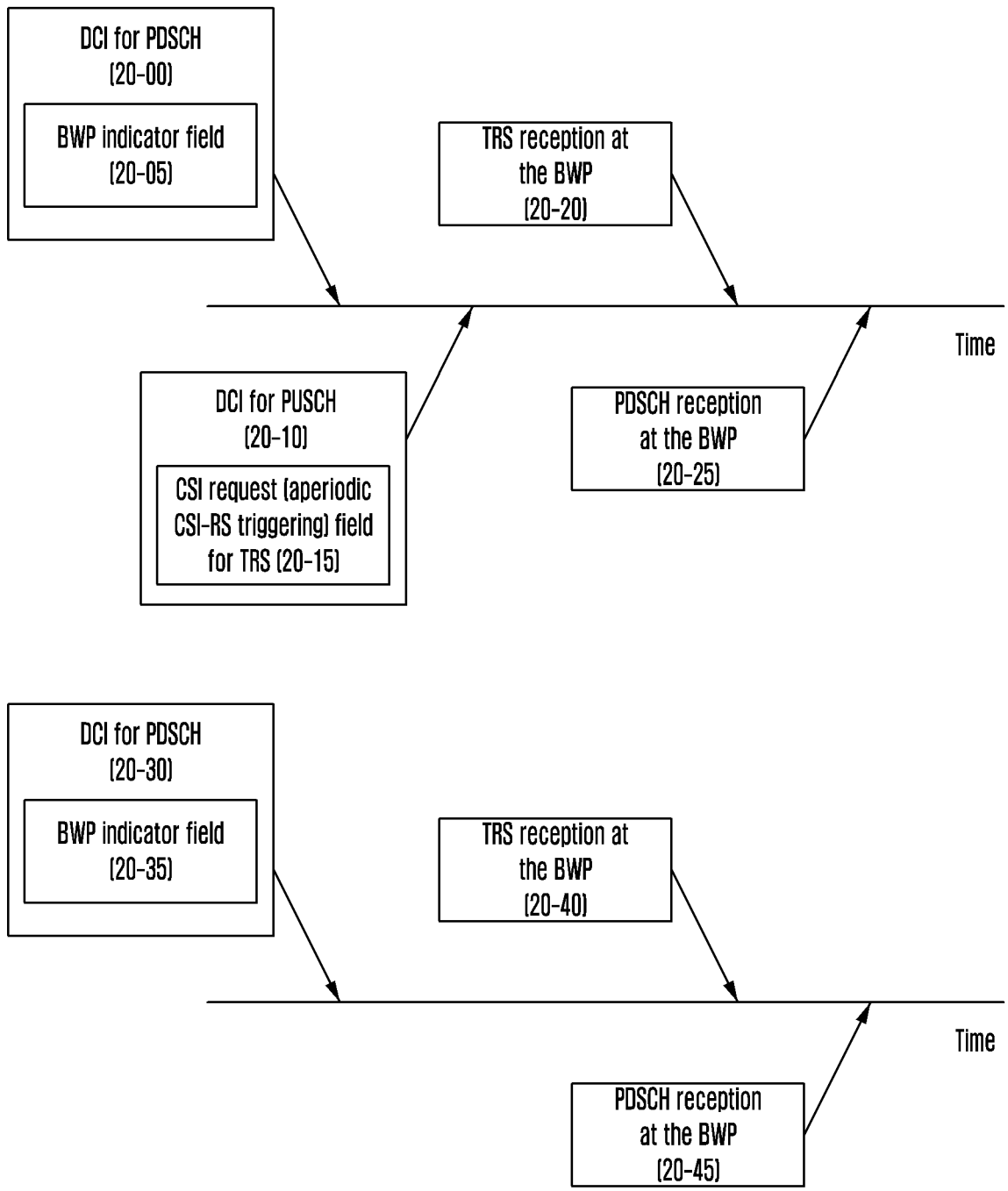
FIG. 20 illustrates an example of the configuration of downlink control information (DCI) for BWP change and TRS transmission according to an embodiment of the disclosure.

FIG. 20 illustrates an example of the configuration of downlink control information (DCI) for BWP change and TRS transmission according to an embodiment of the disclosure.

Referring to FIG. 20, the first method uses independent DCI fields with respect to the BWP switching indication and the TRS triggering, respectively. In this example, the base station may instruct the terminal to perform BWP switching through a BWP indicator field 20-05 of DCI 20-00 for PDSCH scheduling. If it is determined that the TRS transmission is required in the BWP changed according to the first to third embodiments, the base station may trigger an A-TRS to the terminal through a CSI request field 20-15 of DCI 20-10 for PUSCH scheduling. If the base station desires to use an SP-TRS, the DCI 20-10 and the CSI request field 20-15 may be replaced with a MAC CE TRS activation signaling. Thereafter, the terminal may receive the TRS for the changed band 20-20, and may receive a PDSCH for the changed band on the basis of the received TRS 20-25.

The second method implicitly instructs the TRS transmission on the basis of a DCI field for the BWP switching indication. In this example, the base station may instruct the terminal to perform BWP switching through a BWP indicator field 20-35 of DCI 20-30 for PDSCH scheduling. If it is determined that the TRS transmission is required in the BWP changed according to the first to third embodiments, the terminal may understand that the BWP indicator field 20-35 includes triggering for the A-TRS or activation for the SP-TRS. Thereafter, the terminal may receive the TRS for the changed band 20-40, and may receive a PDSCH for the changed band on the basis of the received TRS 20-45. According to the example, it is possible to reduce the signaling burden on aperiodic-CSI (A-CSI)/A-CSI-RS triggering field limited to the maximum of 6 bits and to increase the operational efficiency in FR2.

In this example, the A-TRS triggering or SP-TRS activation 20-10 may include A-TRS triggering offset information or SP-TRS activation offset information in consideration of a transition time required for BWP switching. For example, if an A-TRS triggering offset is set to 2 in a higher layer or by the standard, the terminal may be aware that the A-TRS is transmitted 2 slots after receiving the A-TRS triggering. An operation similar to the above description may also be applied to the SP-TRS activation, so that a detailed description thereof will be omitted.

Fifth Embodiment: Signaling Method for SCell Activation and TRS Transmission/Reception The embodiment provides a detailed signaling method according to at least one of the first to third embodiments.

Figure 21:
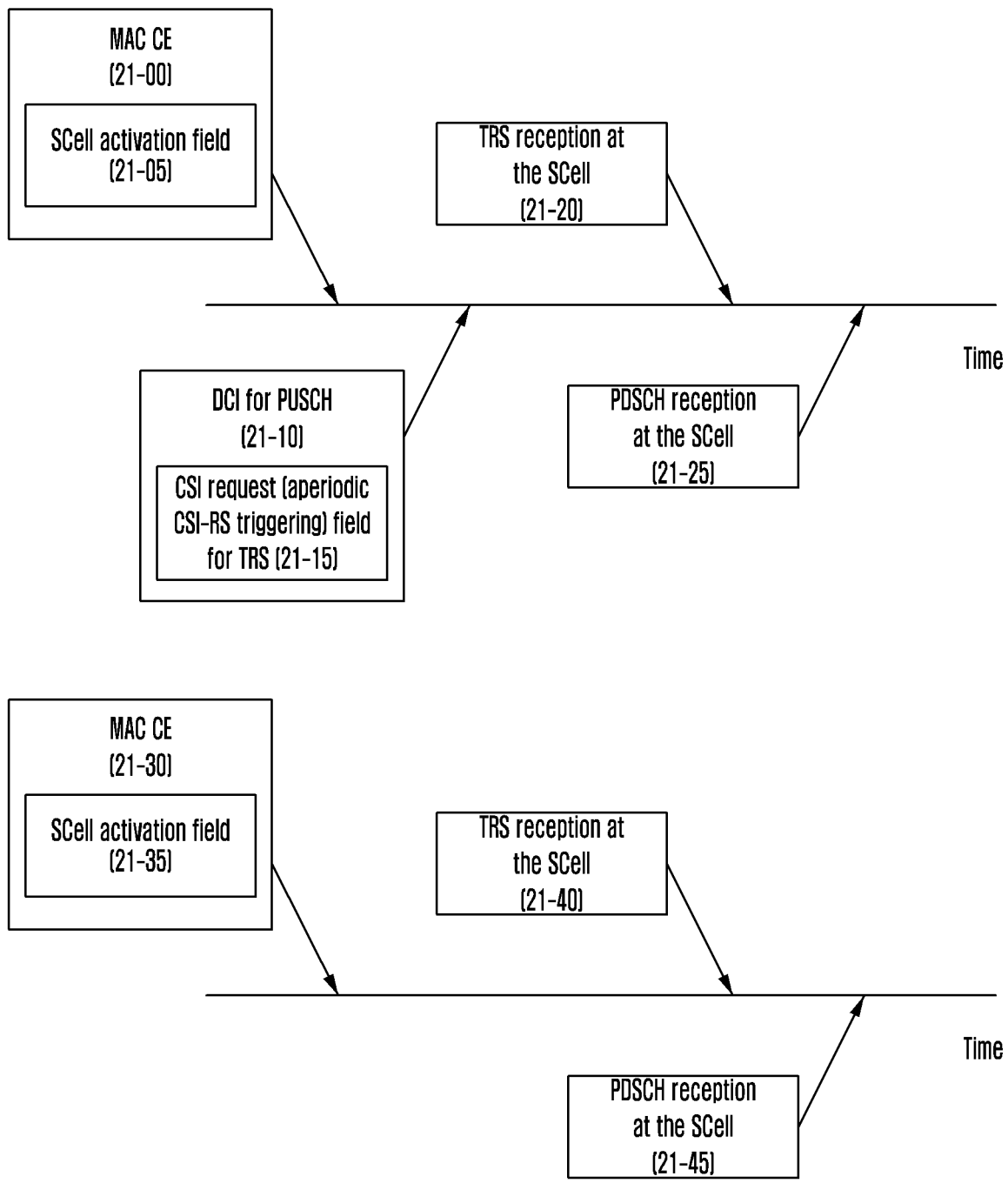
FIG. 21 illustrates an example of configurations of DCI and a MAC CE for SCell activation and TRS transmission according to an embodiment of the disclosure.

FIG. 21 illustrates an example of configurations of DCI and a MAC CE for SCell activation and TRS transmission according to an embodiment of the disclosure.

Referring to FIG. 21, the first method uses independent MAC CE and DCI fields with respect to the SCell activation and the TRS triggering, respectively. In this example, the base station may instruct the terminal to perform SCell activation through a SCell activation field 21-05 of a MAC CE 21-00. If it is determined that the TRS transmission is required in the activated SCell according to the first to third embodiments, the base station may trigger an A-TRS to the terminal through a CSI request field 21-15 of DCI 21-10 for PUSCH scheduling. If the base station desires to use an SP-TRS, the DCI 21-10 and the CSI request field 21-15 may be replaced with a MAC CE TRS activation signaling. Thereafter, the terminal may receive the TRS for the changed band 21-20, and may receive a PDSCH for the changed band on the basis of the received TRS 21-25.

The second method implicitly instructs the TRS transmission on the basis of a MAC CE field for SCell activation. In this example, the base station may instruct the terminal to perform SCell activation through a SCell activation field 21-35 of a MAC CE 21-30. If it is determined that the TRS transmission is required in the Scell changed according to the first to third embodiments, the terminal may understand that the SCell activation field 21-35 includes triggering for the A-TRS or activation for the SP-TRS. Thereafter, the terminal may receive the TRS for the changed band 21-40, and may receive a PDSCH for the changed band on the basis of the received TRS 21-45. According to this example, it is possible to reduce the signaling burden on the A-CSI/A-CSI-RS triggering field limited to the maximum of 6 bits and to increase the operational efficiency in FR2.

In this example, the A-TRS triggering or SP-TRS activation 20-10 may include A-TRS triggering offset information or SP-TRS activation offset information in consideration of a transition time required for BWP switching. For example, if an A-TRS triggering offset is set to 2 in a higher layer or by the standard, the terminal may be aware that the A-TRS is transmitted 2 slots after receiving the A-TRS triggering. An operation similar to the above description may also be applied to the SP-TRS activation, so that a detailed description thereof will be omitted.

Different values in the A-TRS triggering offset or the SP-TRS activation offset according to the fourth and fifth embodiments may be applied to the BWP switching and the SCell activation with reference to the BWP and SCell transition time capability of the terminal.

In the above embodiments, one A-CSI/A-CSI-RS triggering state in the DCI may be connected to a plurality of CSI-RSs. Table 4 shows an example in which a plurality of aperiodic CSI reports, aperiodic CSI-RSs, and aperiodic TRSs are assigned to respective indicator values of the A-CSI/A-CSI-RS triggering state in the DCI through a higher layer. Referring to Table 4, a plurality of A-TRSs may be triggered or a plurality of SP-TRSs may be activated by one indicator (e.g., an indicator 11), and the terminal may assume that only the A-TRS or SP-TRS satisfying the transmission conditions according to the first to third embodiments is transmitted.

TABLE 4

| Indicator values | A-CSI/A-CSI-RS triggering state |
|---|---|
| 00 | A-CSI #1 and A-CSI #2 configured through high layer signaling |
| 01 | A-CSI #1 and A-CSI-RS #1 configured through high layer signaling |
| 10 | A-CSI #2 and A-CSI-RS #2 configured through high layer signaling |
| 11 | A-TRS #1 to A-TRS #N configured through high layer signaling |

Figure 22:
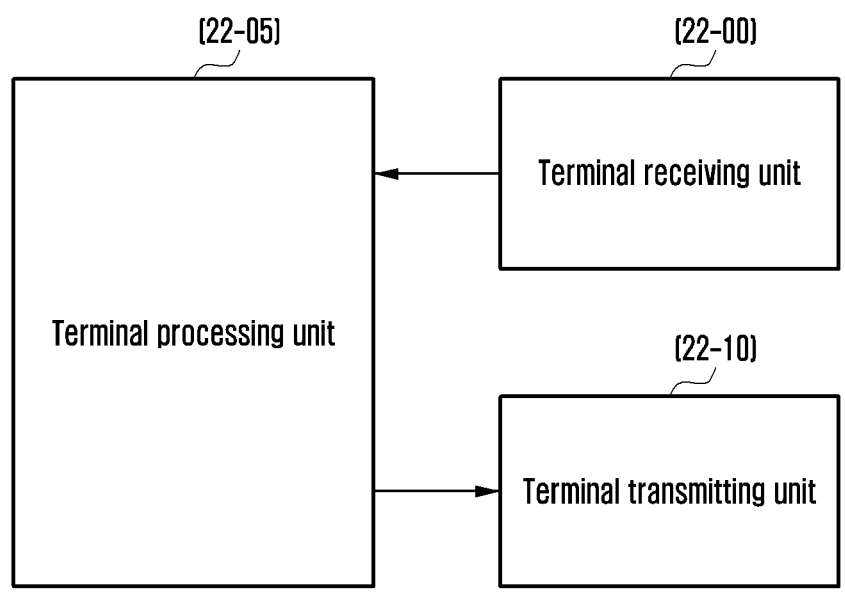
FIG. 22 illustrates a structure of a terminal according to an embodiment of the disclosure.

FIG. 22 illustrates a structure of a terminal according to an embodiment of the disclosure.

Referring to FIG. 22, the terminal may include a receiving unit 22-00 and a transmitting unit 22-10 (or a transceiver, 22-00 and 22-10), and a processing unit 22-05 including a memory and a processor. The transceiver 22-00 and 22-10 and the processing unit 22-05 of the terminal may operate according to the communication method of the terminal described above. However, the components of the terminal are not limited to the above description. For example, the terminal may include more or fewer components than the above-described components. In addition, the transceiver 22-00 and 22-10 and the processing unit 22-05 may be implemented as a single chip.

The transceiver 22-00 and 22-10 may transmit and receive signals to and from the base station. The signals may include control information and data. To this end, the transceiver 22-00 and 22-10 may include a radio frequency (RF) transmitter for up-converting and amplifying the frequency of a transmitted signal, an RF receiver for amplifying the received signal with low noise and down-converting the frequency thereof, and the like. However, this is only an embodiment of the transceiver 22-00 and 22-10, and the components of the transceiver 22-00 and 22-10 are not limited to the RF transmitter and the RF receiver.

In addition, the transceiver 22-00 and 22-10 may receive a signal through a wireless channel, may output the signal to the processing unit 22-05, and may transmit the signal output from the processing unit 22-05 through a wireless channel.

The processing unit 22-05 may store programs and data for the operation of the terminal. In addition, the processing unit 22-05 may store control information or data included in the signal obtained by the terminal. The processing unit 22-05 may include a storage medium, such as a read only memory (ROM), a random access memory (RAM), a hard disk, a compact disc-ROM (CD-ROM), and a digital versatile disc (DVD), or a memory including a combination of storage media.

In addition, the processing unit 22-05 may control a series of processes such that the terminal can operate according to the above-described embodiment. According to some embodiments, the processing unit 22-05 may receive a BW or beam change instruction, and may determine whether or not to transmit the TRS according to the BW or beam change instruction, thereby control the components of the terminal such that the terminal receives the same and performs time/frequency tracking.

Figure 23:
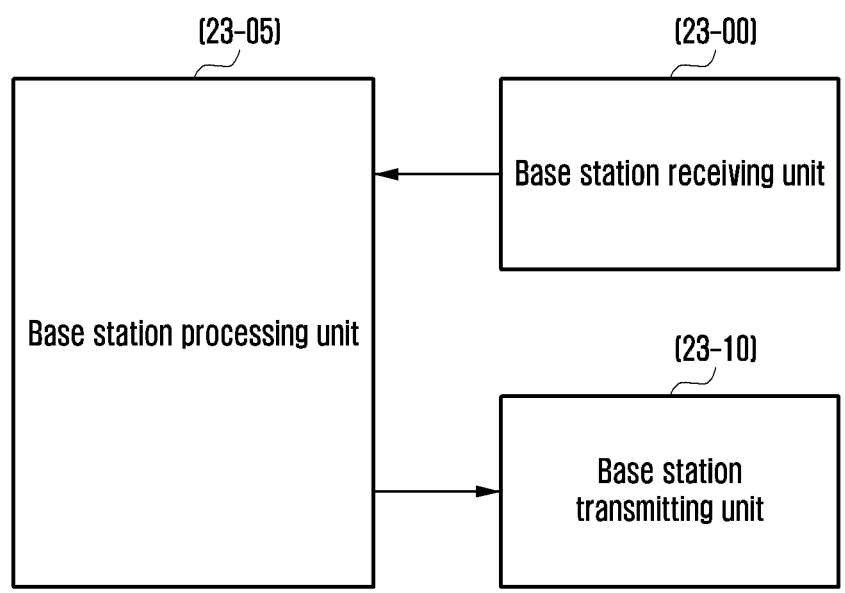
FIG. 23 illustrates a structure of a base station according to an embodiment of the disclosure.

FIG. 23 illustrates a structure of a base station according to an embodiment of the disclosure.

Referring to FIG. 23, the base station may include a receiving unit 23-00 and a transmitting unit 23-10 (or a transceiver 23-00 and 23-10), and a processing unit 23-05 including a memory and a processor. The transceiver 23-00 and 23-10 and the processing unit 23-05 of the base station may operate according to the communication method of the base station described above. However, the components of the base station are not limited to the above description. For example, the base station may include more or fewer components than the above-described components. In addition, the transceiver 23-00 and 23-10 and the processing unit 23-05 may be implemented as a single chip.

The transceiver 23-00 and 23-10 may transmit and receive signals to and from the terminal. The signals may include control information and data. To this end, the transceiver 23-00 and 23-10 may include an RF transmitter for up-converting and amplifying the frequency of a transmitted signal, an RF receiver for amplifying the received signal with low noise and down-converting the frequency thereof, and the like. However, this is only an embodiment of the transceiver 23-00 and 23-10, and the components of the transceiver 23-00 and 23-10 are not limited to the RF transmitter and the RF receiver.

In addition, the transceiver 23-00 and 23-10 may receive a signal through a wireless channel, may output the signal to the processing unit 23-05, and may transmit the signal output from the processing unit 23-05 through a wireless channel.

The processing unit 23-05 may store programs and data for the operation of the base station. In addition, the processing unit 23-05 may store control information or data included in the signal obtained by the base station. The processing unit 23-05 may include a storage medium, such as a ROM, a RAM, a hard disk, a CD-ROM, and a DVD, or a memory including a combination of storage media.

In addition, the processing unit 23-05 may control a series of processes such that the base station can operate according to the above-described embodiment. According to some embodiments, the processing unit 23-05 may control the respective components of the base station to configure BW or beam adaptation and the TRS transmission according thereto to the terminal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, a first tracking reference signal (TRS) for time and frequency tracking;
    performing a bandwidth change or a beam change;
    identifying whether a condition for receiving a TRS for a changed bandwidth or a changed beam is satisfied or not; and
    receiving, from the base station, a second TRS for the changed bandwidth or the changed beam, in case that the condition is satisfied,
    wherein the condition is identified to be satisfied based on a difference between a last TRS reception time before the bandwidth change or the beam change and a first TRS reception time after the bandwidth change or the beam change.

2. The method of claim 1, wherein the condition is identified to be satisfied, in case that a first difference between the last TRS reception time before the bandwidth change and the first TRS reception time after the bandwidth change is greater than a first threshold value, or in case that a second difference between the last TRS reception time before the beam change and the first TRS reception time after the beam change is greater than a second threshold value.

3. The method of claim 1, wherein the second TRS includes an aperiodic TRS (A-TRS) to be triggered by first downlink control information (DCI) for changing a bandwidth part (BWP) or an A-TRS to be triggered by second DCI for requesting channel state information (CSI) subsequent to the first DCI.

4. The method of claim 1, wherein the second TRS includes a semi persistent TRS (SP-TRS) activated by a medium access control (MAC) control component (CE) for activating a secondary cell (SCell) or an aperiodic TRS (A-TRS) to be triggered by downlink control information (DCI) for requesting channel state information (CSI) subsequent to the MAC CE.

5. The method of claim 1, wherein a tracking in the changed bandwidth or the changed beam is performed based on the first TRS, in case that the condition is not satisfied.

6. A method performed by a base station in a wireless communication system, the method comprising:
- transmitting, to a terminal, a first tracking reference signal (TRS) for time and frequency tracking;
- performing a bandwidth change or a beam change for the terminal;
- identifying whether a condition for transmitting a TRS for a changed bandwidth or a change beam is satisfied or not; and
- transmitting, to the terminal, a second TRS for the changed bandwidth or the changed beam, in case that the condition is satisfied,
- wherein the condition is identified to be satisfied based on a difference between a last TRS reception time before the bandwidth change or the beam change and a first TRS reception time after the bandwidth change or the beam change.

7. The method of claim 6, wherein the condition is identified to be satisfied, in case that a first difference between the last TRS reception time before the bandwidth change and the first TRS reception time after the bandwidth change is greater than a first threshold value, or in case that a second difference between the last TRS reception time before the beam change and the first TRS reception time after the beam change is greater than a second threshold value.

8. The method of claim 6, wherein the second TRS includes an aperiodic TRS (A-TRS) to be triggered by first downlink control information (DCI) for changing a bandwidth part (BWP) or an A-TRS to be triggered by second DCI for requesting channel state information (CSI) subsequent to the first DCI.

9. The method of claim 6, wherein the second TRS includes a semi persistent TRS (SP-TRS) activated by a medium access control (MAC) control component (CE) for activating a secondary cell (SCell) or an aperiodic TRS (A-TRS) to be triggered by downlink control information (DCI) for requesting channel state information (CSI) subsequent to the MAC CE.

10. The method of claim 6, wherein a tracking in the changed bandwidth or the changed beam is performed based on the first TRS, in case that the condition is not satisfied.

11. A terminal in a wireless communication system, the terminal comprising:
- a transceiver configured to transmit and receive a signal; and
- a controller configured to:
  - receive, from a base station, a first tracking reference signal (TRS) for time and frequency tracking,
  - perform a bandwidth change or a beam change,
  - identify whether a condition for receiving a TRS in a changed bandwidth or a changed beam is satisfied or not, and
  - receive, from the base station, a second TRS for the changed bandwidth or the changed beam, in case that the condition is satisfied,
- wherein the condition is identified to be satisfied based on a difference between a last TRS reception time before the bandwidth change or the beam change and a first TRS reception time after the bandwidth change or the beam change.

12. The terminal of claim 11, wherein the condition is identified to be satisfied, in case that a first difference between the last TRS reception time before the bandwidth change and the first TRS reception time after the bandwidth change is greater than a first threshold value, or in case that a second difference between the last TRS reception time before the beam change and the first TRS reception time after the beam change is greater than a second threshold value.

13. The terminal of claim 11, wherein the second TRS includes an aperiodic TRS (A-TRS) to be triggered by first downlink control information (DCI) for changing a bandwidth part (BWP) or an A-TRS to be triggered by second DCI for requesting channel state information (CSI) subsequent to the first DCI.

14. The terminal of claim 11, wherein the second TRS includes a semi persistent TRS (SP-TRS) activated by a medium access control (MAC) control component (CE) for activating a secondary cell (SCell) or an aperiodic TRS (A-TRS) to be triggered by downlink control information (DCI) for requesting channel state information (CSI) subsequent to the MAC CE.

15. The terminal of claim 11, wherein a tracking in the changed bandwidth or the changed beam is performed based on the first TRS, in case that the condition is not satisfied.

16. A base station in a wireless communication system, the base station comprising:
- a transceiver configured to transmit and receive a signal; and
- a controller configured to:
  - transmit, to a terminal, a first tracking reference signal (TRS) for time and frequency tracking,
  - perform a bandwidth change or a beam change for the terminal,
  - identify whether a condition for transmitting a TRS for a changed bandwidth or a changed beam is satisfied or not, and
  - transmit, to the terminal, a second TRS for the changed bandwidth or the changed beam, in case that the condition is satisfied,
- wherein the condition is identified to be satisfied based on a difference between a last TRS reception time before the bandwidth change or the beam change and a first TRS reception time after the bandwidth change or the beam change.

17. The base station of claim 16, wherein the condition is identified to be satisfied, in case that a first difference between the last TRS reception time before the bandwidth change and the first TRS reception time after the bandwidth change is greater than a first threshold value, or in case that a second difference between the last TRS reception time before the beam change and the first TRS reception time after the beam change is greater than a second threshold value.

18. The base station of claim 16, wherein the second TRS includes an aperiodic TRS (A-TRS) to be triggered by first downlink control information (DCI) for changing a bandwidth part (BWP) or an A-TRS to be triggered by second DCI for requesting channel state information (CSI) subsequent to the first DCI.

19. The base station of claim 16, wherein the second TRS includes a semi persistent TRS (SP-TRS) activated by a medium access control (MAC) control component (CE) activating a secondary cell (SCell) or an aperiodic TRS (A-TRS) to be triggered by downlink control information (DCI) for requesting channel state information (CSI) subsequent to the MAC CE.

20. The base station of claim 16, wherein a tracking in the changed bandwidth or the changed beam is performed based on the first TRS, in case that the condition is not satisfied.

\* \* \* \* \*